(12) United States Patent
Trumble

(10) Patent No.: US 9,069,352 B2
(45) Date of Patent: Jun. 30, 2015

(54) AUTOMATED FAULT ANALYSIS AND RESPONSE SYSTEM

(75) Inventor: Jeffrey Trumble, Royal Oak, MI (US)

(73) Assignee: JDT Processwork Inc., Royal Oak, MI (US)

( * ) Notice: Subject to any disclaimer, the term of this patent is extended or adjusted under 35 U.S.C. 154(b) by 766 days.

(21) Appl. No.: 13/329,649

(22) Filed: Dec. 19, 2011

(65) Prior Publication Data

US 2012/0154149 A1 Jun. 21, 2012

Related U.S. Application Data

(60) Provisional application No. 61/424,232, filed on Dec. 17, 2010, provisional application No. 61/539,495, filed on Sep. 27, 2011.

(51) Int. Cl.
*G05B 23/02* (2006.01)
*G06F 11/08* (2006.01)
*G05B 19/418* (2006.01)

(52) U.S. Cl.
CPC *G05B 19/41875* (2013.01); *G05B 2219/32222* (2013.01)

(58) Field of Classification Search
CPC .................................. G05B 23/02; G06F 11/08
See application file for complete search history.

(56) References Cited

U.S. PATENT DOCUMENTS

| | | | | |
|---|---|---|---|---|
| 5,450,326 A | * | 9/1995 | Black | 700/121 |
| 5,978,751 A | * | 11/1999 | Pence et al. | 702/179 |
| 6,701,204 B1 | * | 3/2004 | Nicholson | 700/121 |
| 7,349,753 B2 | * | 3/2008 | Paik | 700/110 |
| 2007/0179746 A1 | | 8/2007 | Jiang et al. | |
| 2007/0192064 A1 | | 8/2007 | Nakamura et al. | |
| 2008/0188972 A1 | | 8/2008 | Miller | |

FOREIGN PATENT DOCUMENTS

JP 2004/186445 A 7/2004

* cited by examiner

*Primary Examiner* — Michael Nghiem
*Assistant Examiner* — Robert Dewitty
(74) *Attorney, Agent, or Firm* — Gifford, Krass, Sprinkle, Anderson & Citkowski, P.C.

(57) ABSTRACT

A process for determining a root cause problem for an out-of-tolerance component manufactured by a plurality of operations performed on the component. The process can include providing manufacturing data from at least a subset of plurality of operations performed on a plurality of components and discovering an out-of-tolerance measurement on at least a subset of the plurality of manufactured components downstream from the plurality of operations. An auto-regression analysis between the out-of-tolerance measurement and the plurality of upstream operations can also be performed using the manufacturing data. A correlation between at least one of the upstream operations and the out-of-tolerance measurement can be found and the correlation can result in the identification of at least one upstream operation that is the root cause of the out-of-tolerance measurement.

13 Claims, 27 Drawing Sheets

AUTOMATED FAULT ANALYSIS AND RESPONSE SYSTEM

CROSS-REFERENCE TO RELATED APPLICATIONS

This application claims priority to U.S. Provisional Application Ser. No. 61/424,232 filed on Dec. 17, 2010, and U.S. Provisional Application Ser. No. 61/539,495 filed on Sep. 27, 2011, both of which are incorporated herein in their entirety by reference.

FIELD OF THE INVENTION

The present invention is related to an automated fault analysis and response system, and in particular to a system and method of synthesizing preexisting manufacturing data to automatically deliver critical information to proper personnel on a real-time basis and transform the data in order to determine a root cause for a process variation.

BACKGROUND OF THE INVENTION

Manufacturing processes typically result in product variation. Product variation is the result of one or more of a number of factors including variations in material, variations in the environment, and worn equipment. When the product variation exceeds certain levels the product is defective, resulting in either scrap or the necessity to rework the product. This results in huge cost to the manufacturers. As a result, systems have been developed which monitor parts and products produced, measure the uniformity, and provide alerts when parts are out of tolerance. However, current systems do not integrate the data of the entire manufacturing process in such a way that it is possible to readily determine the root cause of the variation. Nor is the information distributed to proper personnel on a timely basis. As such, a system and/or method that would provide critical information related to the root cause of the variation to predefined and critical personnel would be desirable.

SUMMARY OF THE INVENTION

A process for determining a root cause problem for an out-of-tolerance component manufactured by a plurality of operations performed on the component is provided. The process can include providing manufacturing data from at least a subset of plurality of operations performed on a plurality of components and discovering an out-of-tolerance measurement on at least a subset of the plurality of manufactured components downstream from the plurality of operations. An auto-regression analysis between the out-of-tolerance measurement and the plurality of upstream operations can also be performed using the manufacturing data. A correlation between at least one of the upstream operations and the out-of-tolerance measurement can be found and the correlation can result in the identification of at least one upstream operation that is the root cause of the out-of-tolerance measurement.

The process can also include providing manufacturing data from at least a subset of operation stations where a plurality of components have been routed through and machined, drilled, milled, welded and the like and discovering an out-of-tolerance measurement on at least a subset of the plurality of manufactured components downstream from the plurality of operation stations. An auto-regression analysis between the out-of-tolerance measurement and the plurality of upstream operation stations can be performed using the manufacturing data and a correlation between at least one of the upstream operation stations and the out-of-tolerance measurement can be determined. In this manner the correlation can afford for the identification of at least one upstream operation station—where one or more operations on the components occurs—that is the root cause of the out-of-tolerance measurement.

The process can also include sending, electronically "pushing", etc., at least one report and/or alert related to the root cause to predefined personnel. In some instances, continuous monitoring of the at least one upstream operation and/or station that is the root cause of the out-of-tolerance measurement can be instantly initiated and executed. The continuous monitoring affords for immediate notification of predefined personnel when the monitored upstream operation and/or station executes an out-of-tolerance operation. Furthermore, the notification can be an electronic notification that includes a graphical illustration of manufacturing data for the out-of-tolerance operation.

A statistical analysis on each of the plurality of operations using the manufacturing data can be performed for the purpose of determining an out-of-tolerance performance level for each of the operations and/or stations. In addition, the statistical analysis can provide a ranking of the plurality of operations and/or stations with respect to which one or more operations are producing out-of-tolerance measurements on the plurality of components. The ranking can identify a subset of worst-performing operations and an auto-regression analysis can be performed between one or more of the worst-performing operations and/or stations and all upstream operations and/or stations related thereto. In this manner, a root-cause operation and/or station for a given worst-performing operation can be determined, even if the root-cause operation and/or station is not one of the top worst-performing operations identified by the statistical analysis ranking. Furthermore, component serial number data, routing data and/or birth history data can afford for identification of an out-of-tolerance operation and/or station performed on the component even if the particular operation does not provide manufacturing data for analysis.

DETAILED DESCRIPTION OF THE PRESENT INVENTION

The present invention provides a process and a system for determining a root cause problem for an out-of-tolerance component manufactured by a plurality of operations performed on the component. Therefore, the system and process have utility as a quality control tool.

Figure 1:
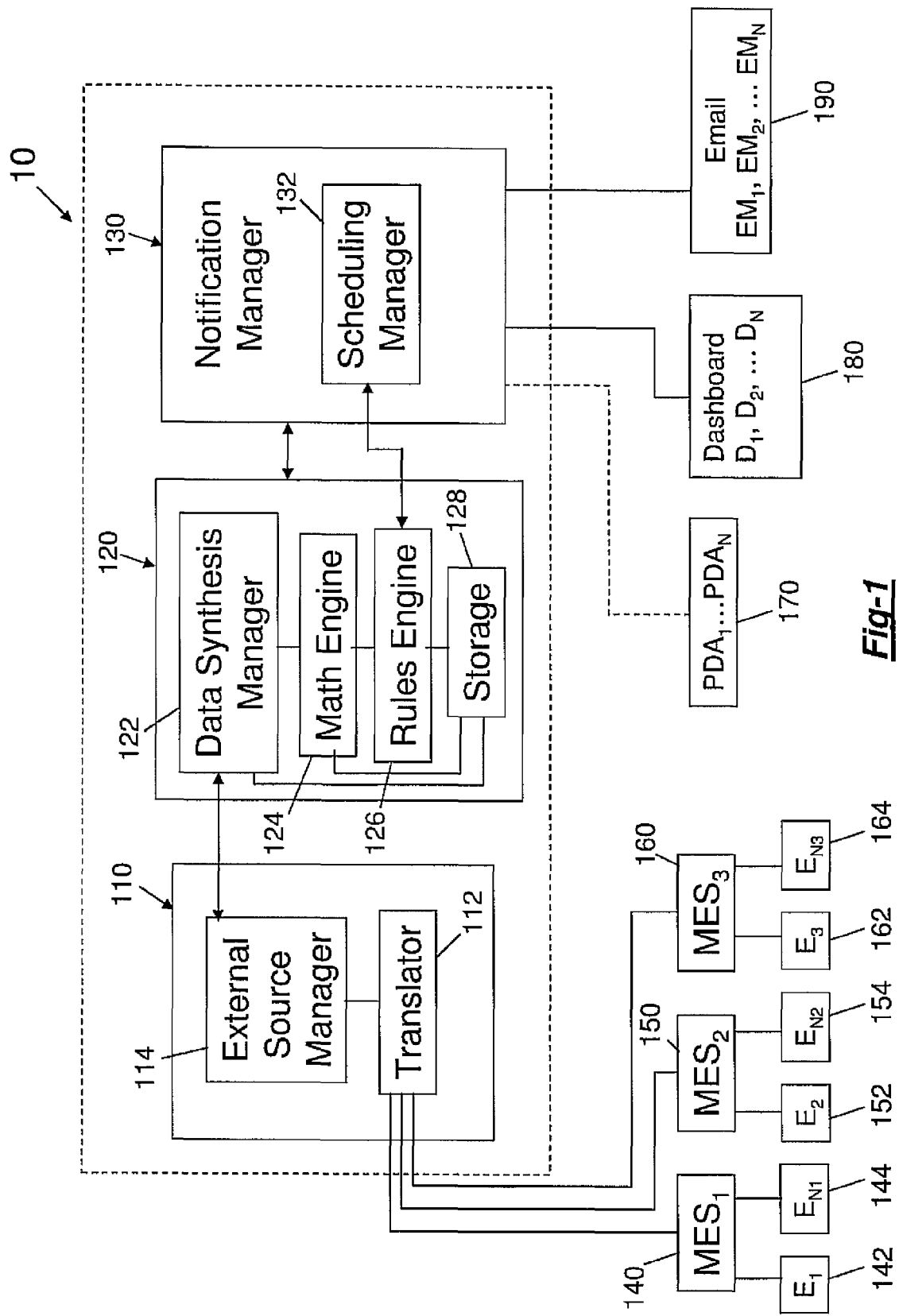
FIG. 1 is a schematic illustration of a system according to an embodiment disclosed herein.

Referring to FIG. 1, a process and/or system 10 can use manufacturing data obtained from one or more manufacturing execution software (MES) databases 140, 150, 160 already collected by a manufacturing facility. Such MES databases typically include data which can be exported from one or more machines and/or equipment 142, 144, . . . , 164 throughout the manufacturing facility. Data collected from various MES databases 140, 150, 160 can include metadata such as department; zone; line; operation; station; activity tags; pass/fail data; variable data from any machine that measures part attributes; time and stamp data; component tracking data, also known as birth history data; and the like. A data source manager 110 for the system and/or process 10 can have a translation module 112 which can convert collected MES data into a standard format using required Sequel Query Language (SQL).

Through the required SQL, converted data from one or more MES databases 140, 150, 160 can be delivered to a data synthesis manager 120 via an external source manager 114 a and the external source manager 114 can determine whether one or more manufacturing stations in the production facility are in a state of control or in an out-of-control state. Stated differently, the data synthesis manager 122 can determine whether one or more components routed through a station has an out-of-control or out-of-tolerance aspect or measurement which is a result of an out-of-control or out-of-tolerance station or operation. The data synthesis manager 120 can include a synthesis engine 124 (Math Engine) and lookup tables in memory or storage 128 that can apply limits to the amount of variation tolerated for each station and/or operation. In addition, a user input module can be included which permits a user to input upper and lower limits of variation into the system and into the lookup tables. In the event that user input upper and lower limits are not entered into the system, the process and/or system can automatically apply default limits. The data synthesis manager 122 can also use a rules engine 126 to compare actual part data with the upper and lower limits stored in the lookup tables in order to determine the state of variations for various manufacturing stations and/or operations in real time. It is appreciated that if a comparison reveals that a component or part is outside of a limit range, then an out-of-control state exists.

The math and rules engines 124, 126 can apply multiple regression analysis to various sets of station and/or operation data to determine an upstream root cause of a downstream out-of-control station and/or operation. Such an analysis can result in a determination of a station and/or operation ID and an activity that is the root of a problem. The data synthesis manager 122 can store groups of dependent stations in a knowledge database for easy and real-time retrieval of dependent station resolution. In addition, the data synthesis manager 122 can perform various calculations on variable attribute data collected by the one or more MES databases 140, 150, 160 from each of the stations under investigation, and then determine which one or more stations and/or operations contain a dependent variable, and which upstream stations and/or operations contain one or more suspect independent variables. Furthermore, the data synthesis manager can perform a regression analysis and prioritize resultant R-squared values determined by the math engine 124, and then list the R-squared values in a table from strongest relationship to weakest relationship. Through the use of a user interface or "dashboard", the data synthesis manager 122 can provide or display a regression plot for any of the suspect stations in an on-demand manner requested by a user. As such, the process and system permit accurate allocation of problem-solving resources to an upstream root-cause station instead of the downstream station where excessive variation has first been observed.

If an out-of-control state is observed, a message can be sent to a notification manager 130 which can send alerts to preselected recipients with information related to location and nature of a problem and also send a real-time chart that graphs performance data of the out-of-control station and/or operation for a current time (time of alert) minus a preselected time, e.g. 8 hours (shows previous 8 hours of performance) to facilitate problem-solving decisions. It is appreciated that alerts can be automatically sent or "pushed" when a station is determined to be out of control. The alerts can also be sent only to predetermined key problem solvers who are then prompted to take action and return the station to a state of control.

The notification manager 130 can send information in a number of different forms including wireless to a PDA 170, highlights on a recipient's personalized dashboard 180 and/or via an email 190. The alerts can contain information on specific causes of the out-of-control state including issues caused by upstream stations and/or operations discovered to be out-of-control by the inventive process and system.

The dashboard can be used to build and activate real-time monitors, build and activate performance reports that are automatically distributed at user-specified time intervals on a particular day and time, standardizing a manner in which the information is received and how it is to be sent. Information can also automatically be forwarded to other personnel by the notification manager 130 and can be accessible through personalized dashboards. Such dashboards are designed to provide only information necessary to support a decision that is specifically required for an individual user's area of responsibility.

The notification manager 130 can also include a scheduling manager 132 which can issue performance reports at preselected intervals such as daily, weekly, bi-weekly, monthly, quarterly, yearly, and the like. Such performance reports can contain a summary of information automatically distilled from the one or more MES databases concerning an area of manufacturing, such as a zone, line, department, or an entire plant. The performance reports can include trend reports such as Cpk histogram reports, final test Pareto reports, and the like, and summary reports with aggregated data for a plant facility, a department, a line, worst performing stations, etc.

The scheduling manager 132 can have a set of rules which can control the amount of accessibility to information as a function of job title, job responsibilities, and the like and thus address the problem of information overload to employees. In addition, the rules engine 126 can automatically regulate an amount of information sent to a user's dashboard based on a rules assignment and user permission given by an administrator and set by the administrator through their own personalized dashboard. Therefore, the system and process can provide only the critical and/or right information to the critical and/or right personnel at the critical and/or right time.

The system and/or process can also include determination of a root cause or true source of a defect when there are operations at stations which are not directly connected to the one or more MES databases 140, 150, 160. For example, a series of parallel ranks of manufacturing equipment, e.g. a plurality of CNC machines, may not be part of a network and data gathering strategy. However, by virtually monitoring such unconnected stations, a root cause or true source of a defect can be determined. As such, the system and process can create a "virtual gauge" through manipulation of component serial numbers and mining data contained in various databases.

Figure 2:
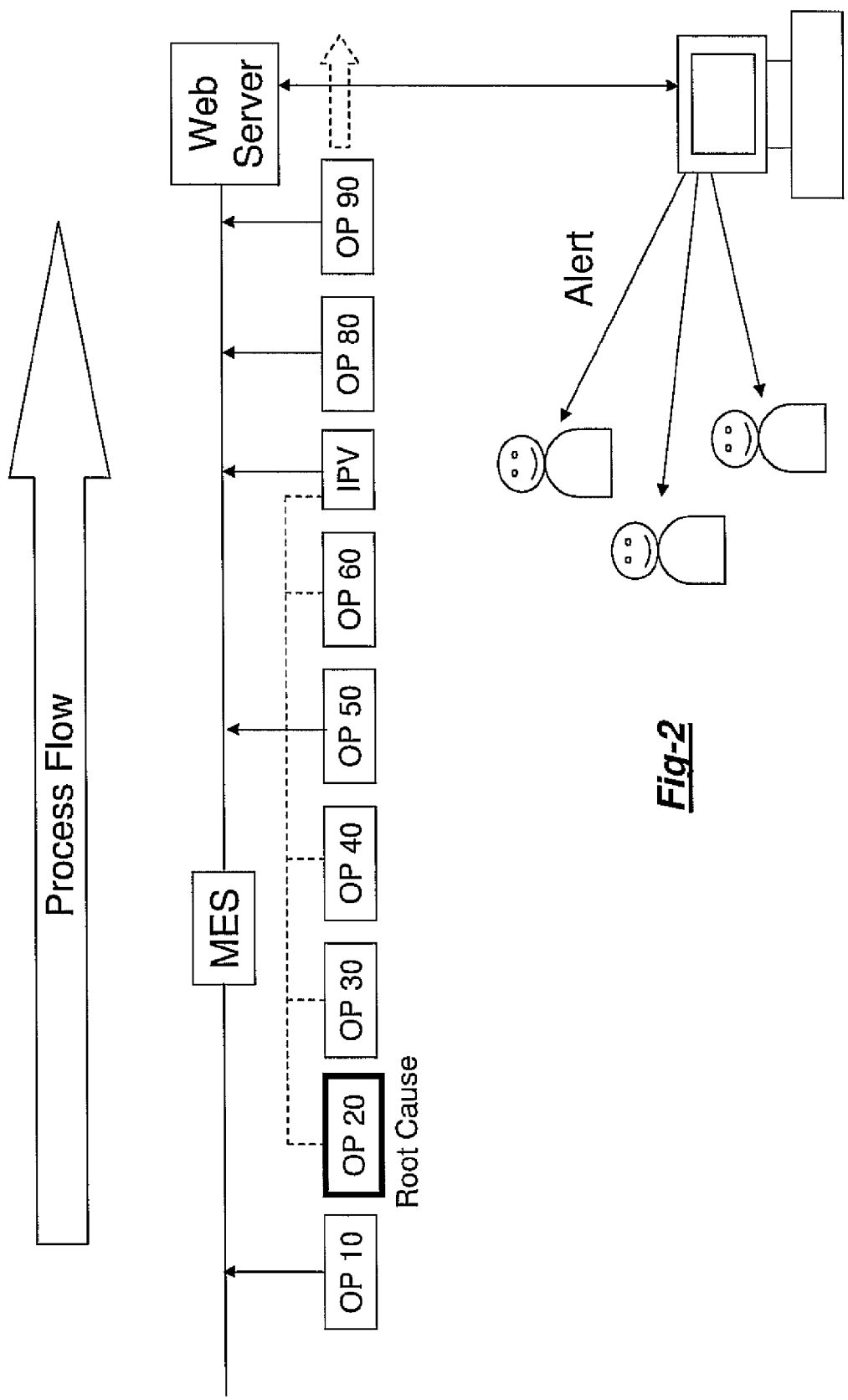
FIG. 2 is a schematic illustration of a system having a plurality of manufacturing stations connected to an embodiment of the present invention.

For example and for illustrative purposes only, FIG. 2 provides a schematic flow diagram for virtual monitoring in which a first operation OP 10 provides MES data to a database DB1 but subsequent operations OP 20 . . . OP 60 do not provide manufacturing data to the database DB1. However, downstream from OP 60 is a gauge station IPV that is capable of taking measurements on a manufactured component and also capable of assigning preferred measurements to the upstream equipment located at stations OP 20 . . . OP 60, even if there are five to ten parallel machines performing the same operation on a given component. As such, assigning measurement data to each upstream operation can create a virtual gauge to each operation.

A virtual database is created by combining variable and binomial data acquired by the gauging station IPV, and the "virtual" data can be linked with part serialization data. The virtual database can represent a manufacturing stream and consist of both connected and virtually connected stations and/or operations. Information regarding each of the nonconnected stations can be entered into the database along with a particular machine's function and identity. Additionally, information related to characteristics produced on a particular part or component, such as an inner diameter of a particular bore, can be loaded into the database. If the process and/or system include only one machine producing the bore, the correlation between measurements taken downstream and the unconnected upstream station can be direct. However, if there are a number of parallel stations performing the same task, it can be necessary to follow a birth history of a given component in order to assign the measurement values to a particular machine. Therefore, by using information about a path that a particular component has taken, the data synthesis manager 122 can perform an analysis of upstream stations and/or operations and determine which machine is creating an error.

For example, and assuming that stations OP20 . . . OP60 represents six parallel CNC machines, as each component or part reaches the gauging station IPV, measurements can be taken and associated with a serial number for the particular component. A birth history can be included that is associated with a component and/or pallet that carries a series of components. The birth history can also include particular machines which are in the stream of production flow for the component and thereby allow for tracking of which machine resulted in a measurement at gauge station IPV. As such, the virtual monitor can contain information about function and position of the upstream machines and use the path of the component to assign data to a particular machine and then monitor the machine's performance.

Again, the part serialization and path information can permit the system to correlate measurement information which is gathered at IPV with a particular machine located upstream therefrom. Thereafter, reports can be generated and alerts can be sent to personnel in the same manner as disclosed above.

In order to better explain the process and system, an illustrative example for an embodiment of the present invention will be discussed below using illustrative computer screen shots.

Figure 3:
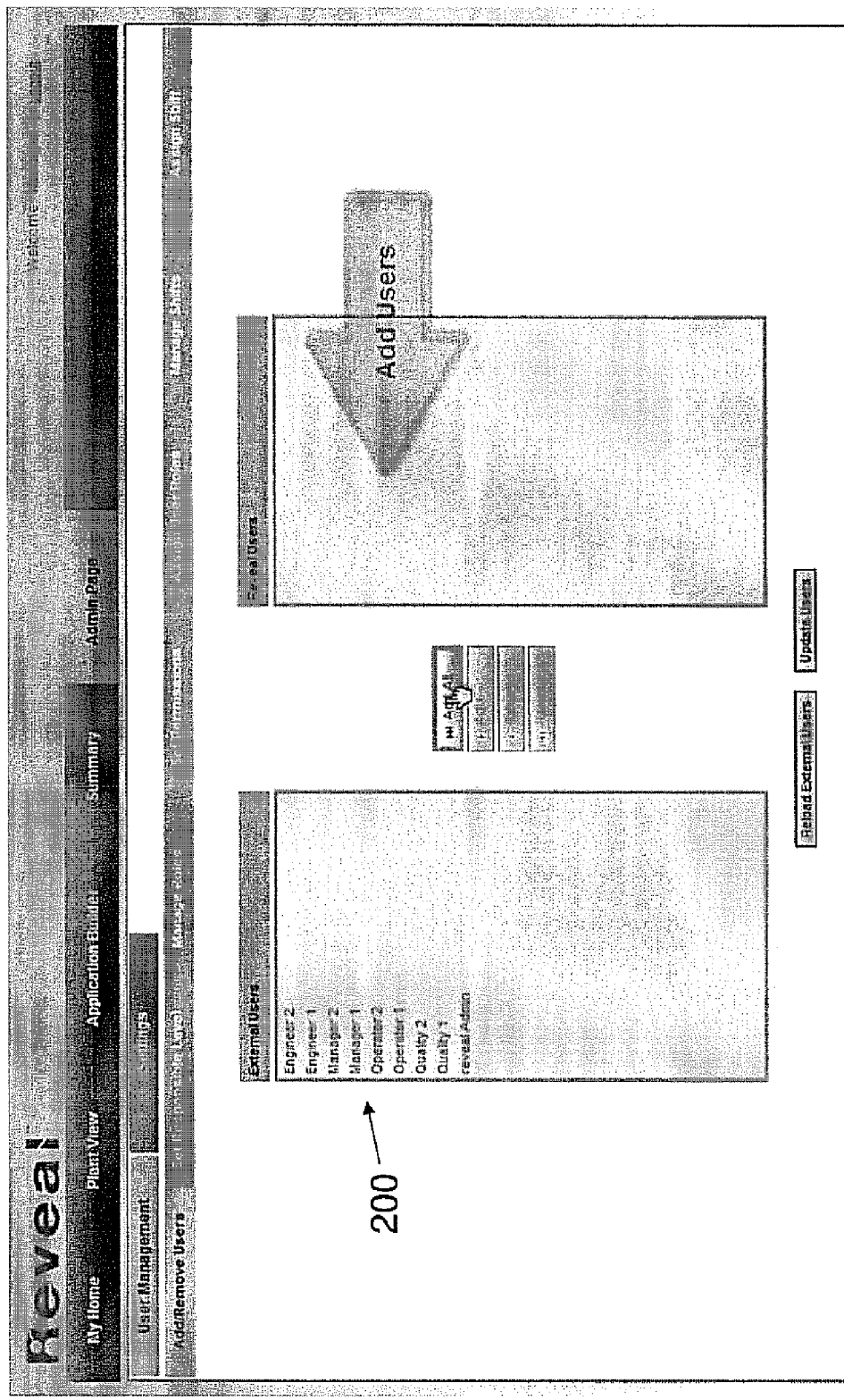
FIG. 3 is an illustrative screen shot for an embodiment of the present invention in which additional users can be added to an inventive system disclosed herein.
Figure 4:
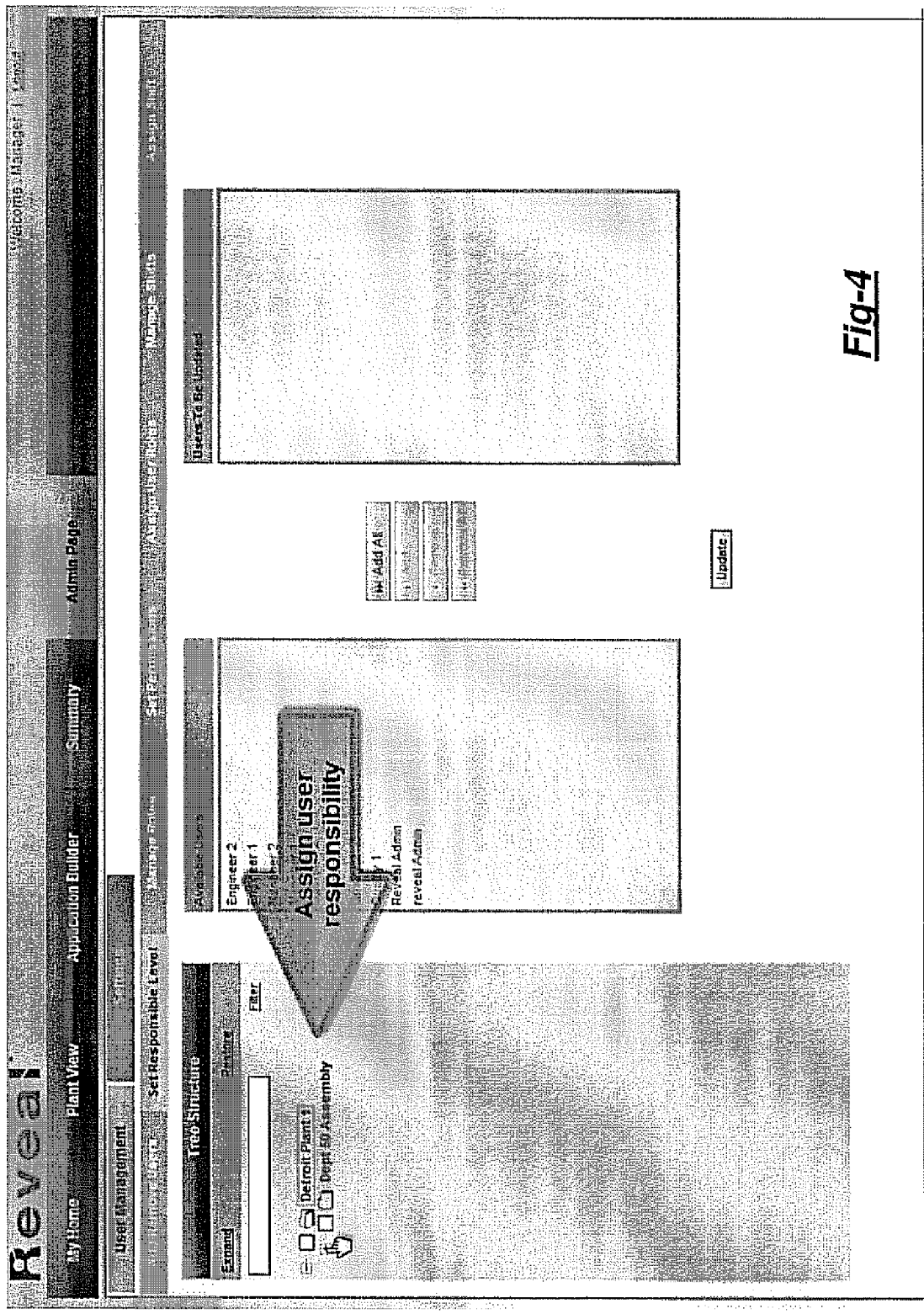
FIG. 4 is an illustrative screen shot for an embodiment of the present invention in which responsibility levels are assigned to users of the system.
Figure 5:
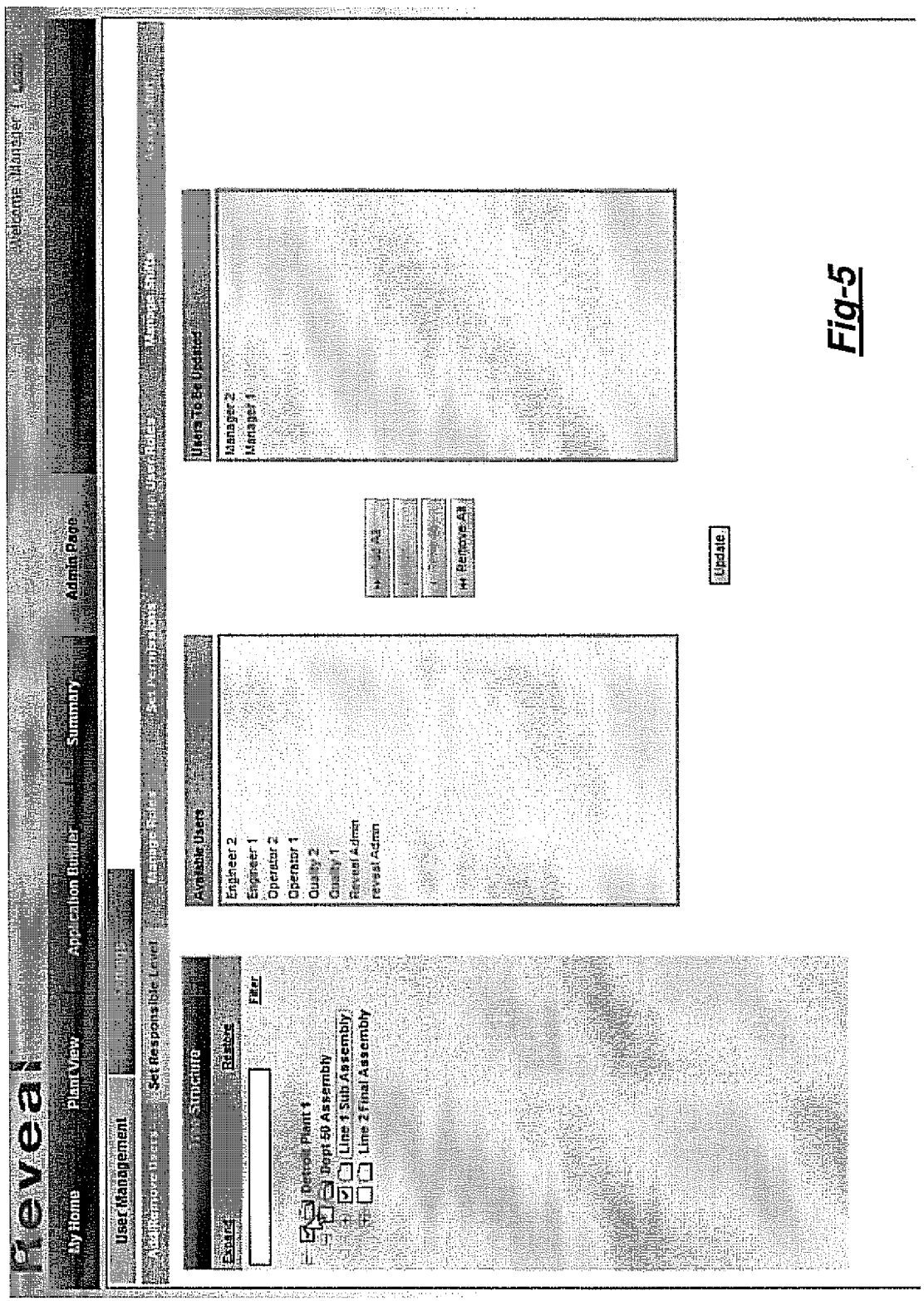
FIG. 5 is an illustrative screen shot showing a tree structure for a manufacturing facility and users having access to various portions of the tree structure.

Referring now to FIG. 3, the system can afford for the addition or subtraction of users 200 to use the system. In addition, the responsibility for an assigned user can be set by an administrator. For example, FIG. 4 illustrates a production facility titled "Detroit Plant 1" with a branch titled "Dept 50 Assembly" being within Detroit Plant 1 and Line 1 Sub Assembly and Line 2 Final Assembly branched underneath or within Dept 50 Assembly as shown in FIG. 5. Upon selecting a particular plant, department, assembly line, zone, and the like, user responsibility levels can be assigned by selecting available users and updating users assigned to a particular portion of the assembly process. For example, FIG. 6 illustrates that Manager 2 and Manager 1 have been assigned to Line 1 Sub Assembly of Dept 50 Assembly for Detroit Plant 1.

Figure 6:
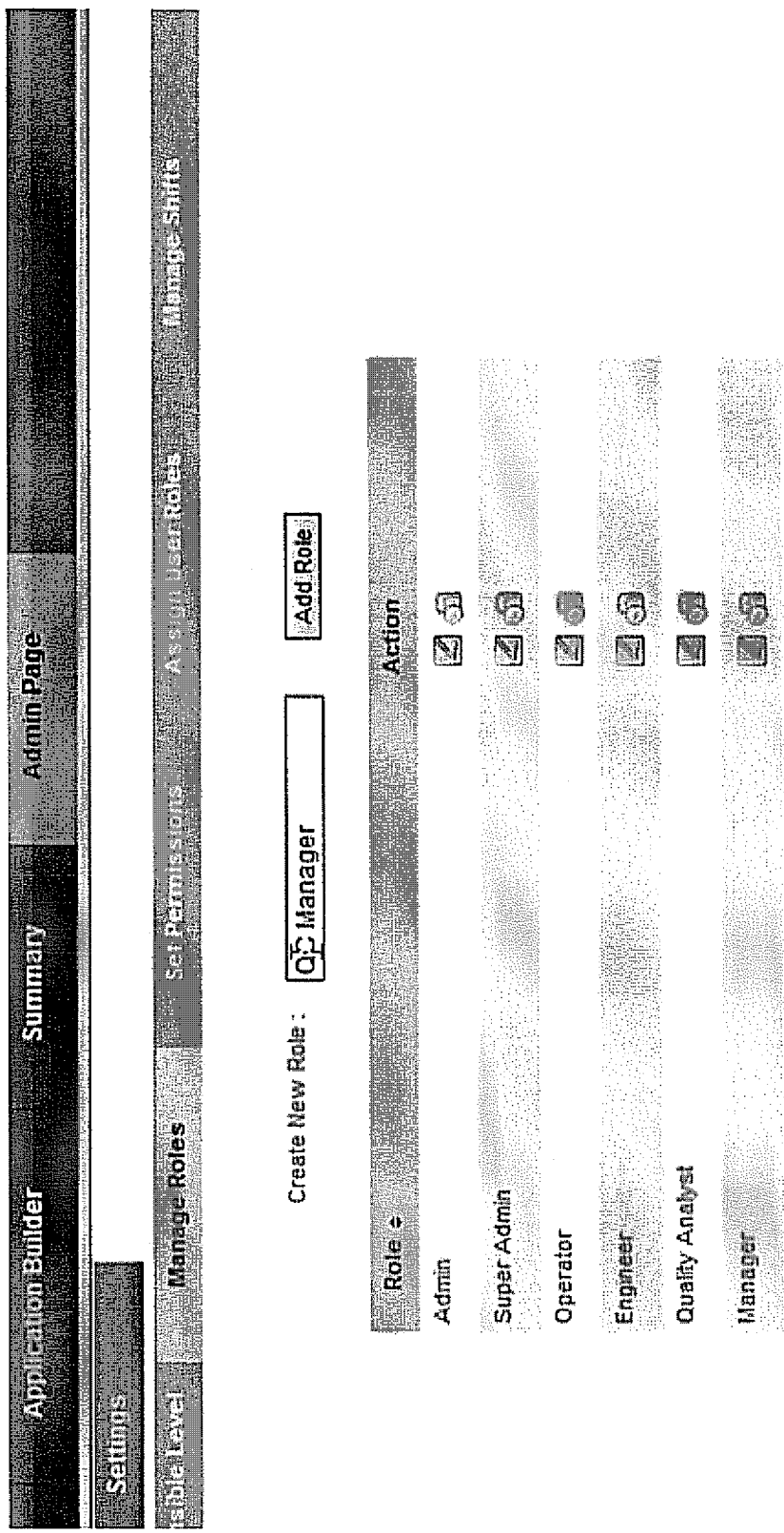
FIG. 6 is an illustrative screen shot a new role being added to the system.
Figure 7:
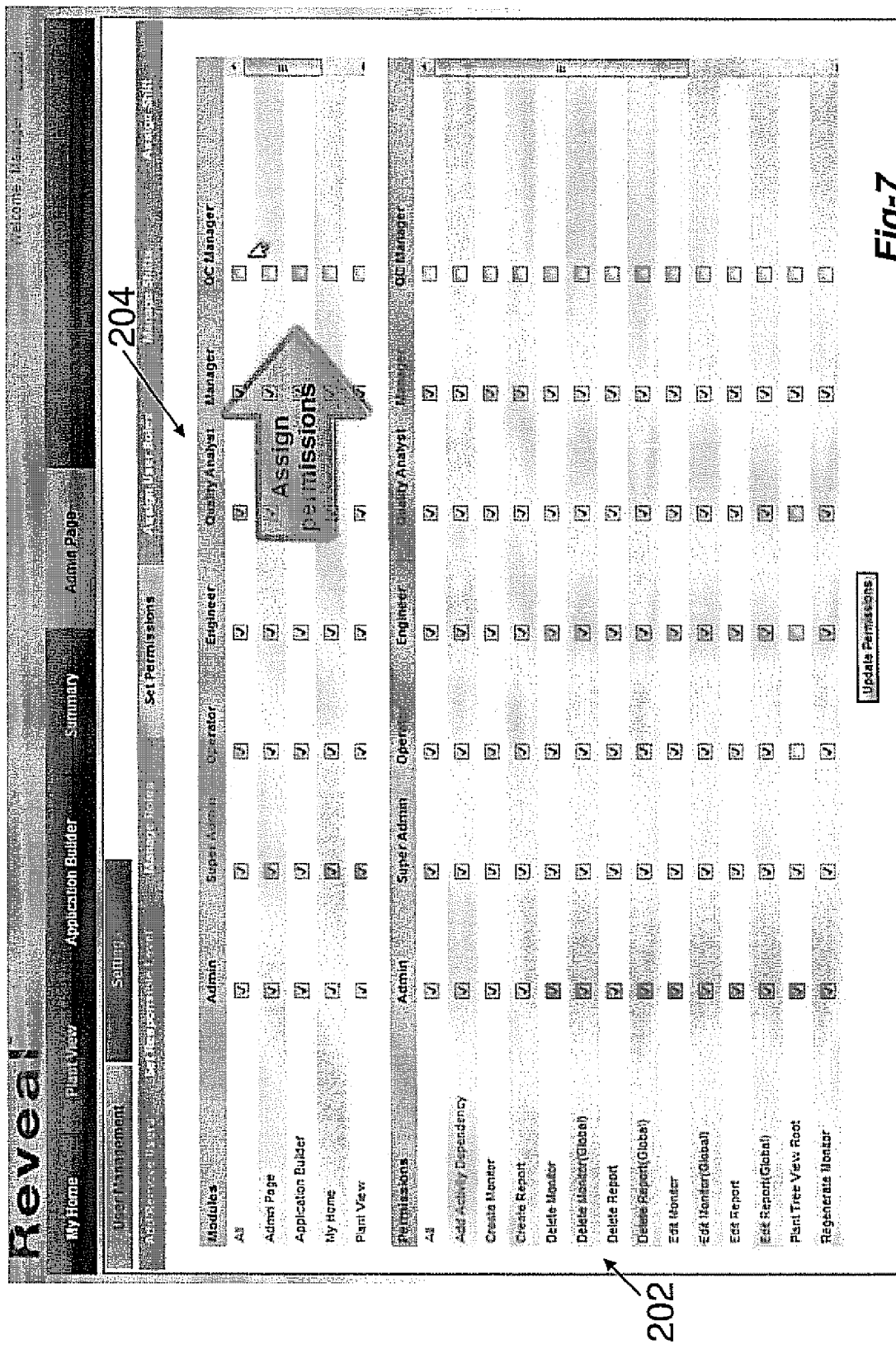
FIG. 7 is an illustrative screen shot showing permission assignments being assigned for different roles in the system.

In the event that additional roles are required and/or needed within a manufacturing system, the system affords for the creation of new roles as shown in FIG. 6 where a QC Manager role is added to the Detroit Plant 1 facility. In addition, FIG. 7 illustrates permission settings 202 assigned to various roles 204 such that selected individuals can have as much or as little access to the system as desired.

Figure 8:
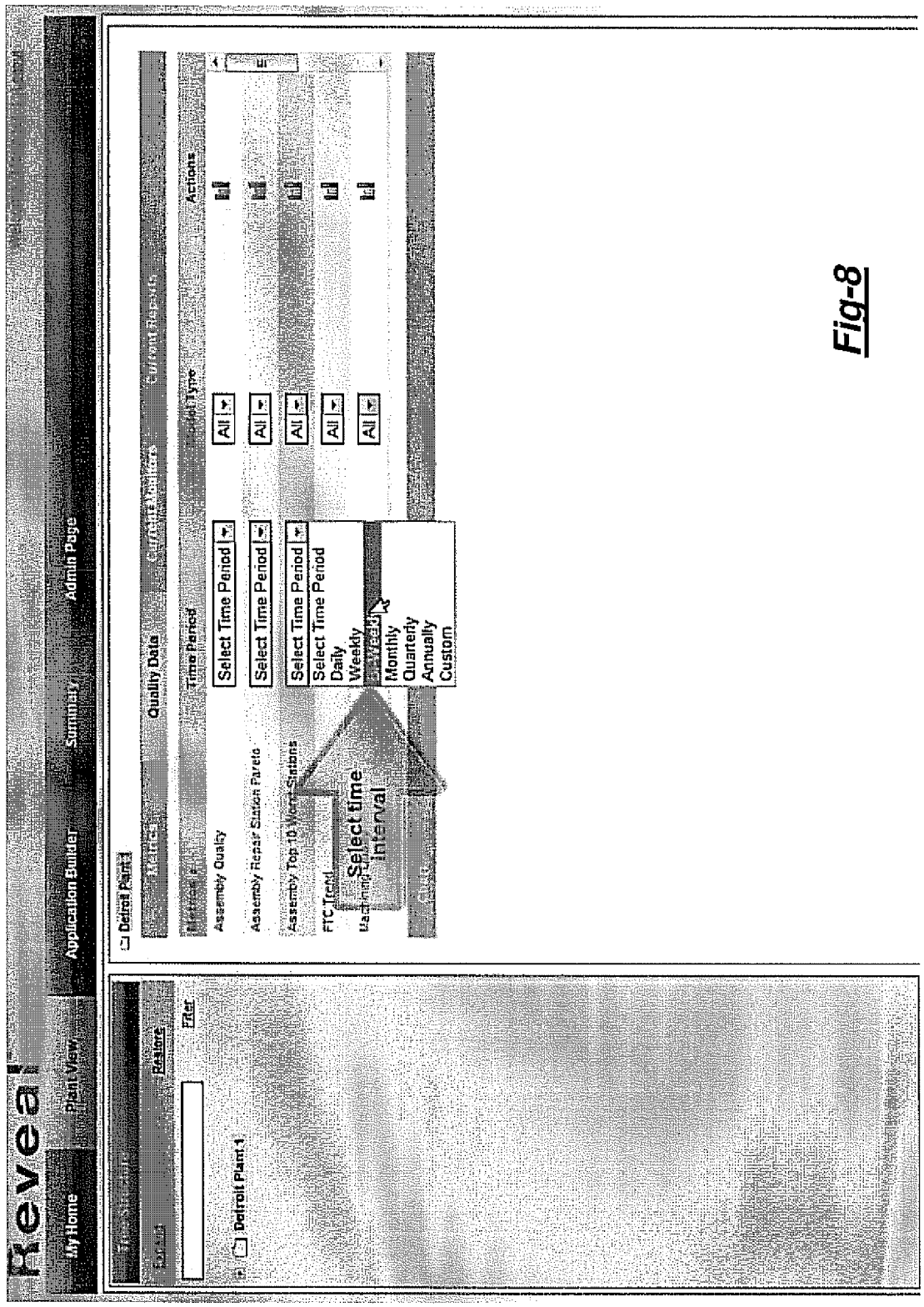
FIG. 8 is an illustrative screen shot showing a selection of a time interval to collect data for a manufacturing facility.
Figure 9:
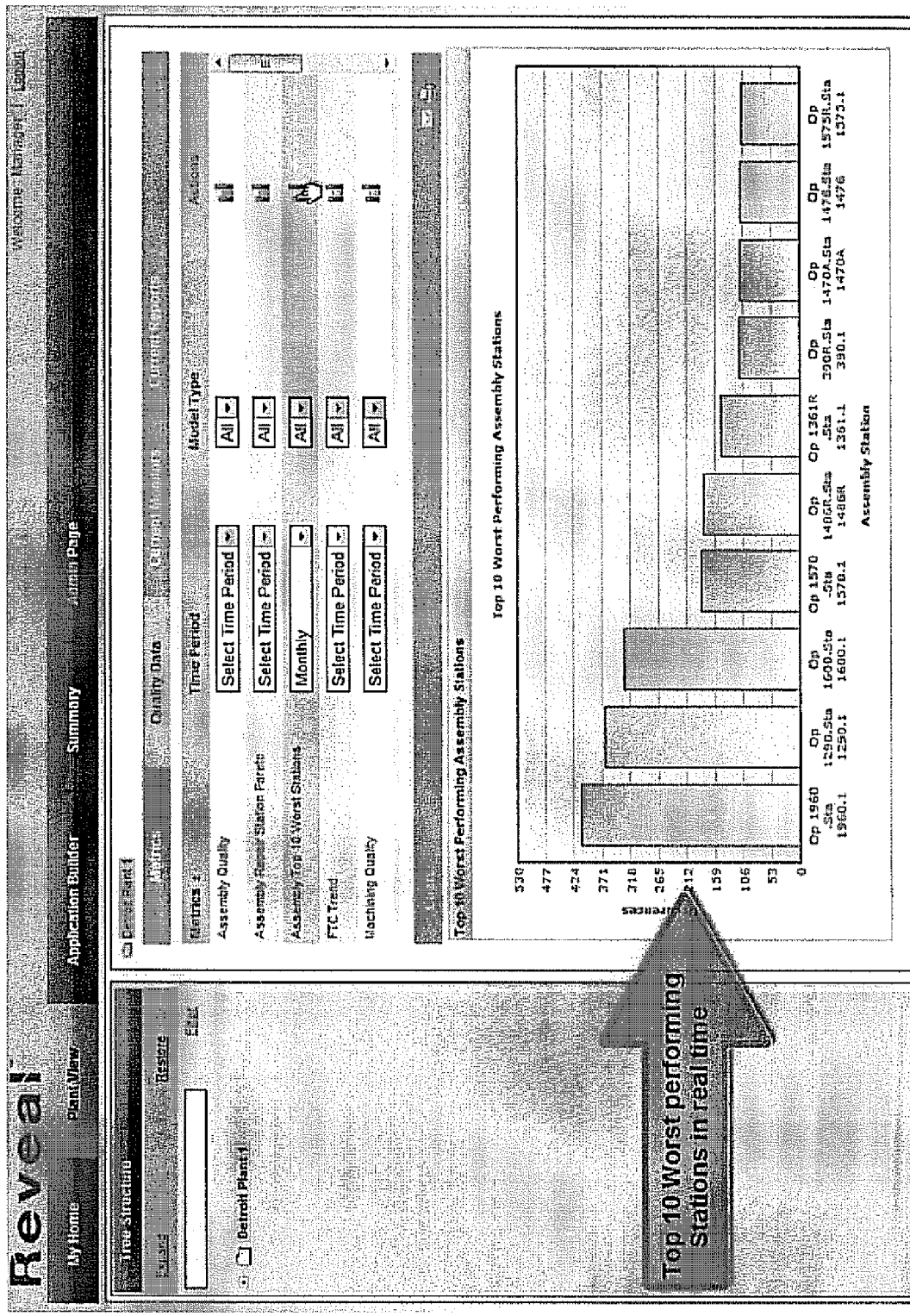
FIG. 9 is an illustrative screen shot showing a report produced in real time for a list of top ten worst performing assembly stations for a manufacturing facility.

Turning now to FIGS. 8 and 9, the system can provide reports containing quality data for the entire Detroit Plant 1 facility or, in the alternative, any subportion thereof. In particular, FIG. 8 illustrates the selection of the top ten worst performing stations within the Detroit Plant 1 facility and FIG. 9 illustrates a chart that with occurrences of out-of-control or out-of-tolerance occurrences as a function of assembly station. Based on the reports shown in FIG. 9, a user of the system can quickly determine problematic areas or stations within a manufacturing facility.

It is appreciated that prior art systems have lacked the ability to determine the root cause of a poorly performing station, operation, and the like. As such, the inventive system and process provides for monitoring of such poorly performing stations and auto-regression analysis to determine a root cause for such poor performance.

Figure 10:
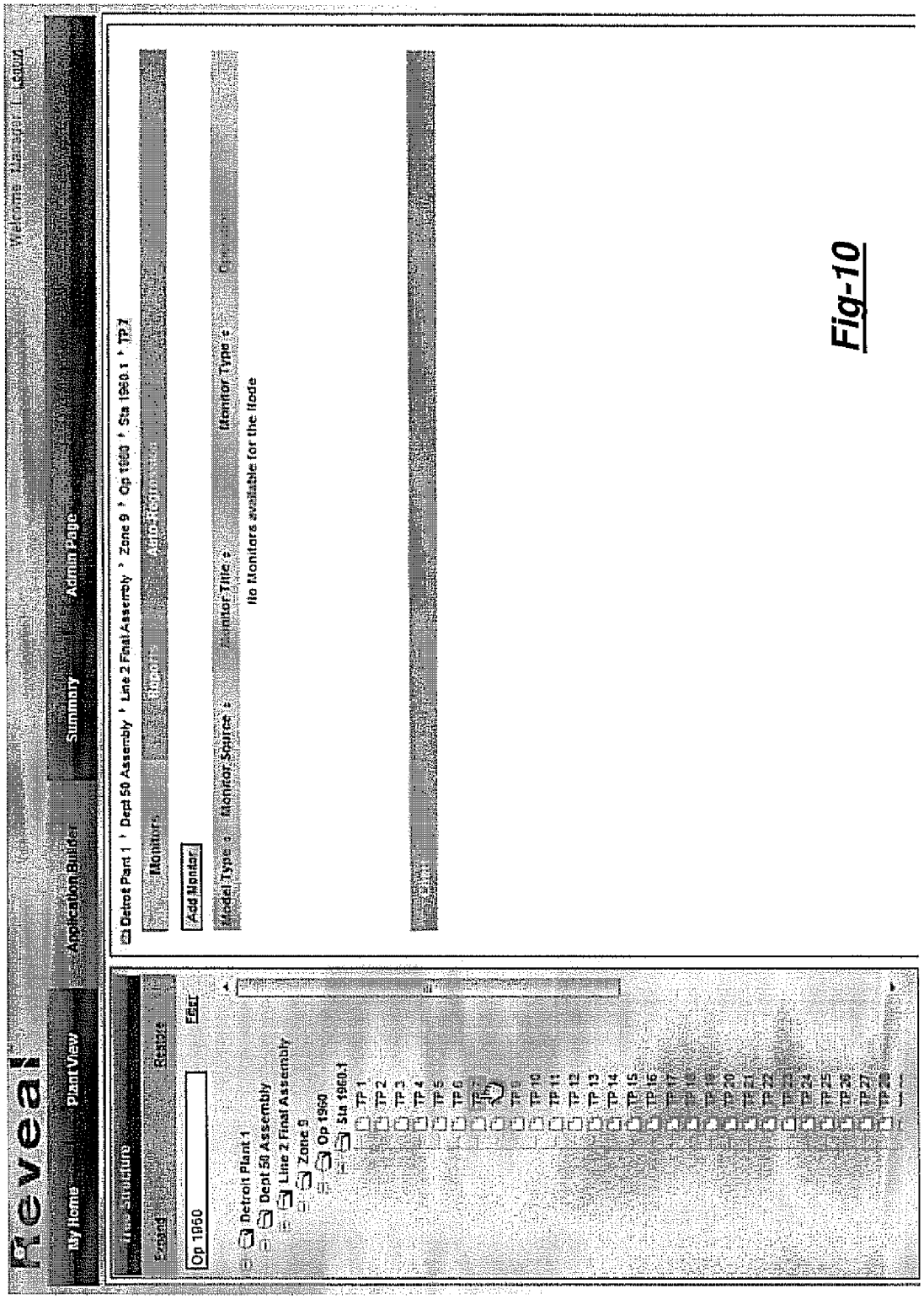
FIG. 10 is an illustrative screen shot showing a more detailed tree structure for a manufacturing facility and a tab to add a monitor to a particular test point (TP 7) at a particular station (Sta 1960.1)
Figure 11:
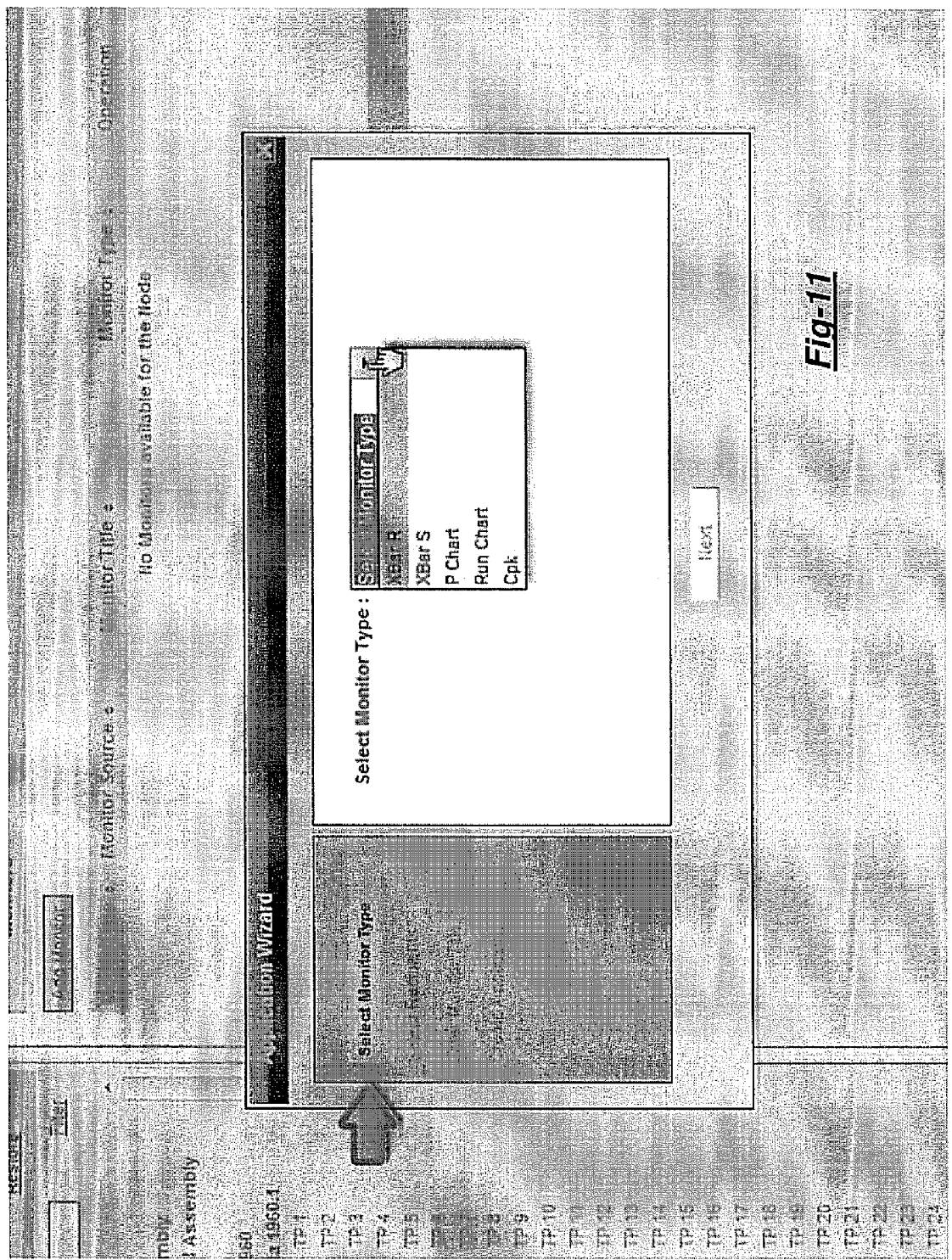
FIG. 11 is an illustrative screen shot showing a selection of a monitor type.
Figure 12:
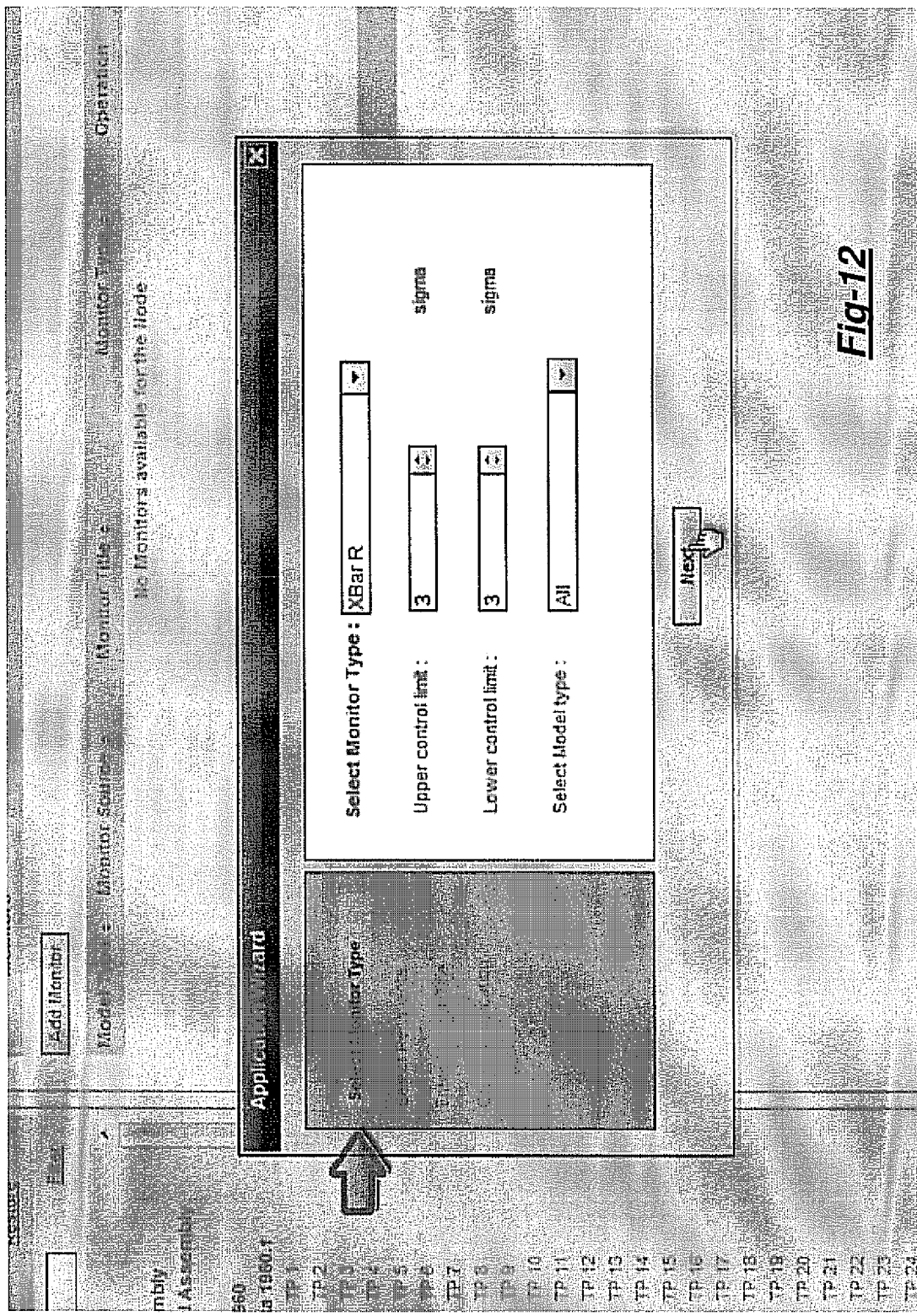
FIG. 12 is an illustrative screen shot showing various parameters that can be assigned to a monitor type.

Referring now to FIG. 10, a user can select a particular test point at a particular station, for example test point 7 (TP 7) for station 1960.1 (Sta 1960.1) and instantly assign a monitor to the station as illustrated in FIGS. 11 and 12 where an XBar R monitor for TP 7 is selected. It is appreciated that for the purposes of the present invention, the term "instantly" refers to a user selecting desired options from a dashboard, e.g. using a keyboard and/or computer mouse, and a monitor on a particular station or operation beginning as soon as the desired monitor type, parameters, etc., have been selected. As such, a monitor can be assigned to a station and/or operation within seconds (e.g. within 5 seconds) which is referred to as instantly when compared to prior art systems.

Figure 13:
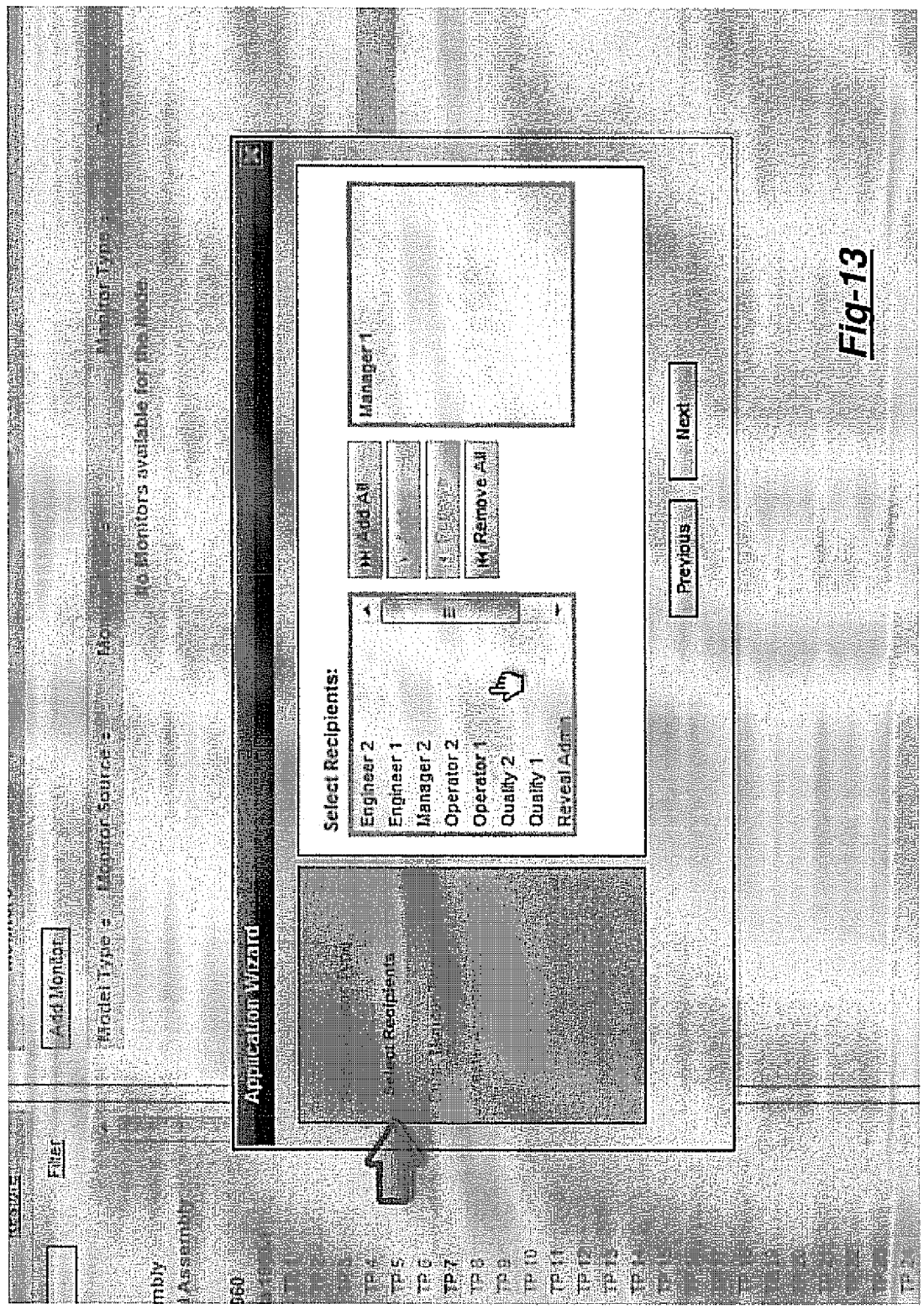
FIG. 13 is an illustrative screen shot showing recipients to receive monitor information.
Figure 14:
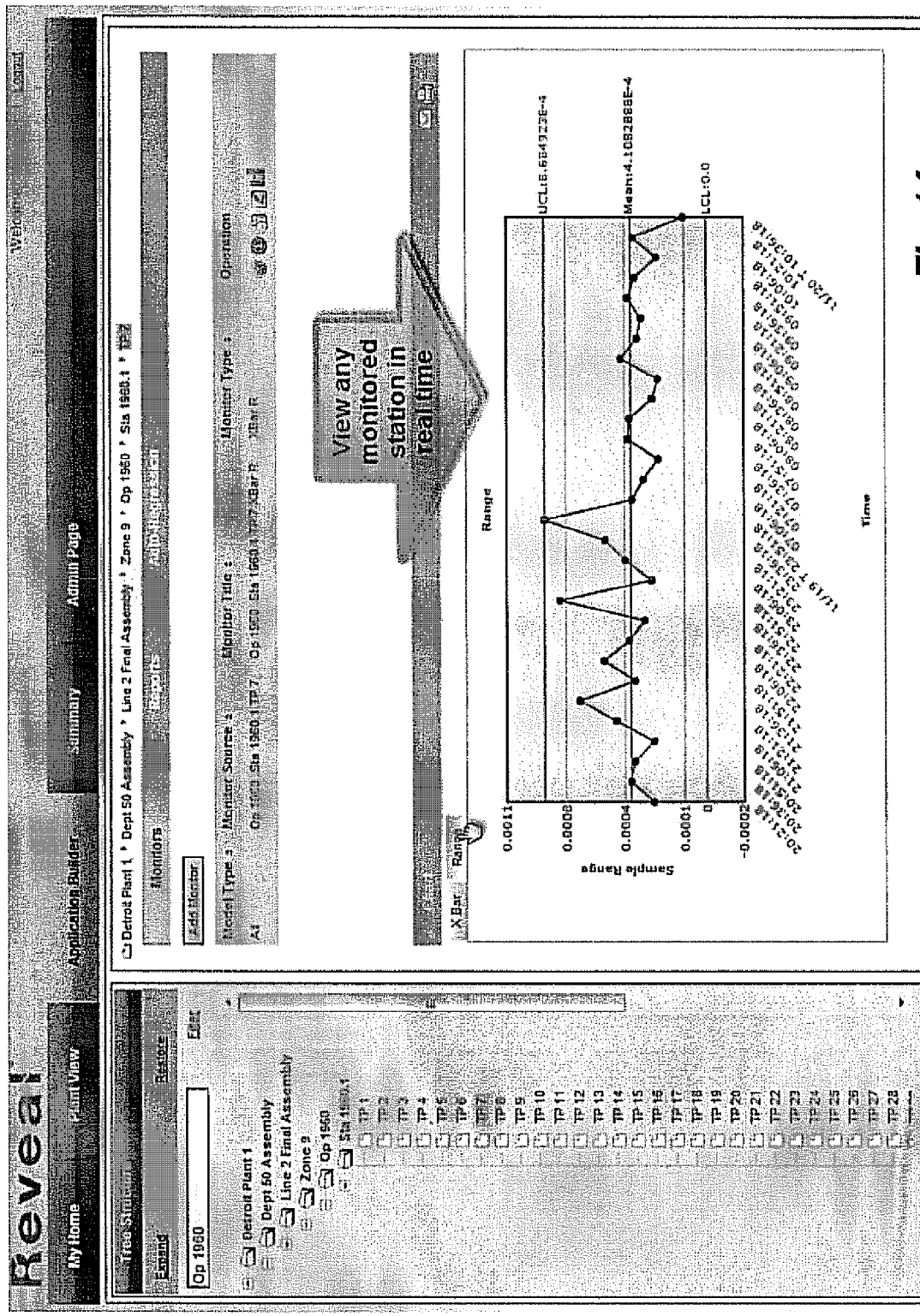
FIG. 14 is an illustrative screen shot of monitor results that can be sent to a recipient and/or viewed on a dashboard.

FIG. 13 illustrates that the system can also afford for select recipients to be chosen to receive a monitor report. In some instances, the monitor can be scheduled to deliver an alert to selected recipients in the event that an out-of-tolerance measurement is determined by the system, and the alert, with or without an illustrative plot as shown in FIG. 14, can be pushed to a recipient via wireless and/or wired communication.

Figure 15:
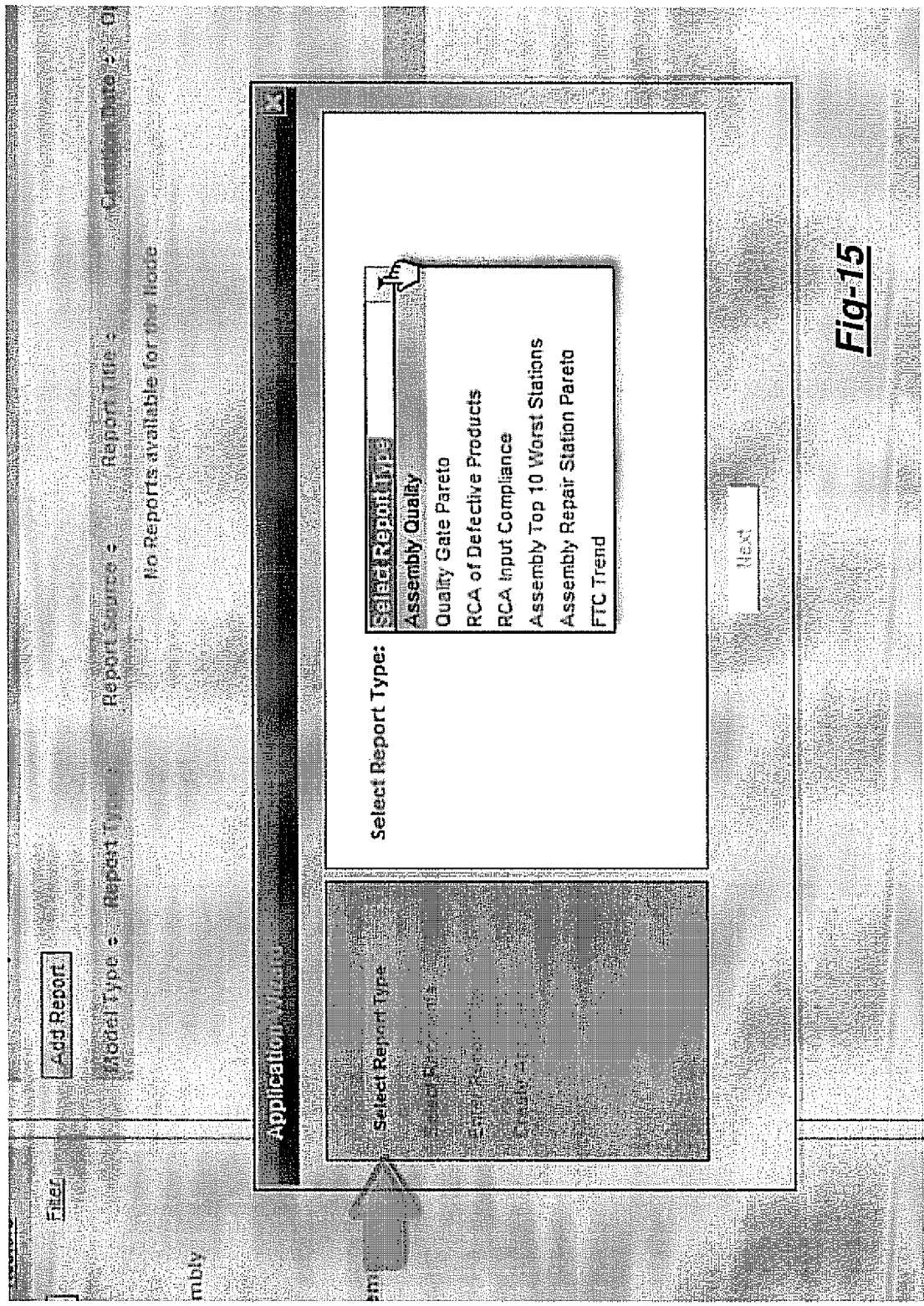
FIG. 15 is an illustrative screen shot showing selection of a report type.
Figure 16:
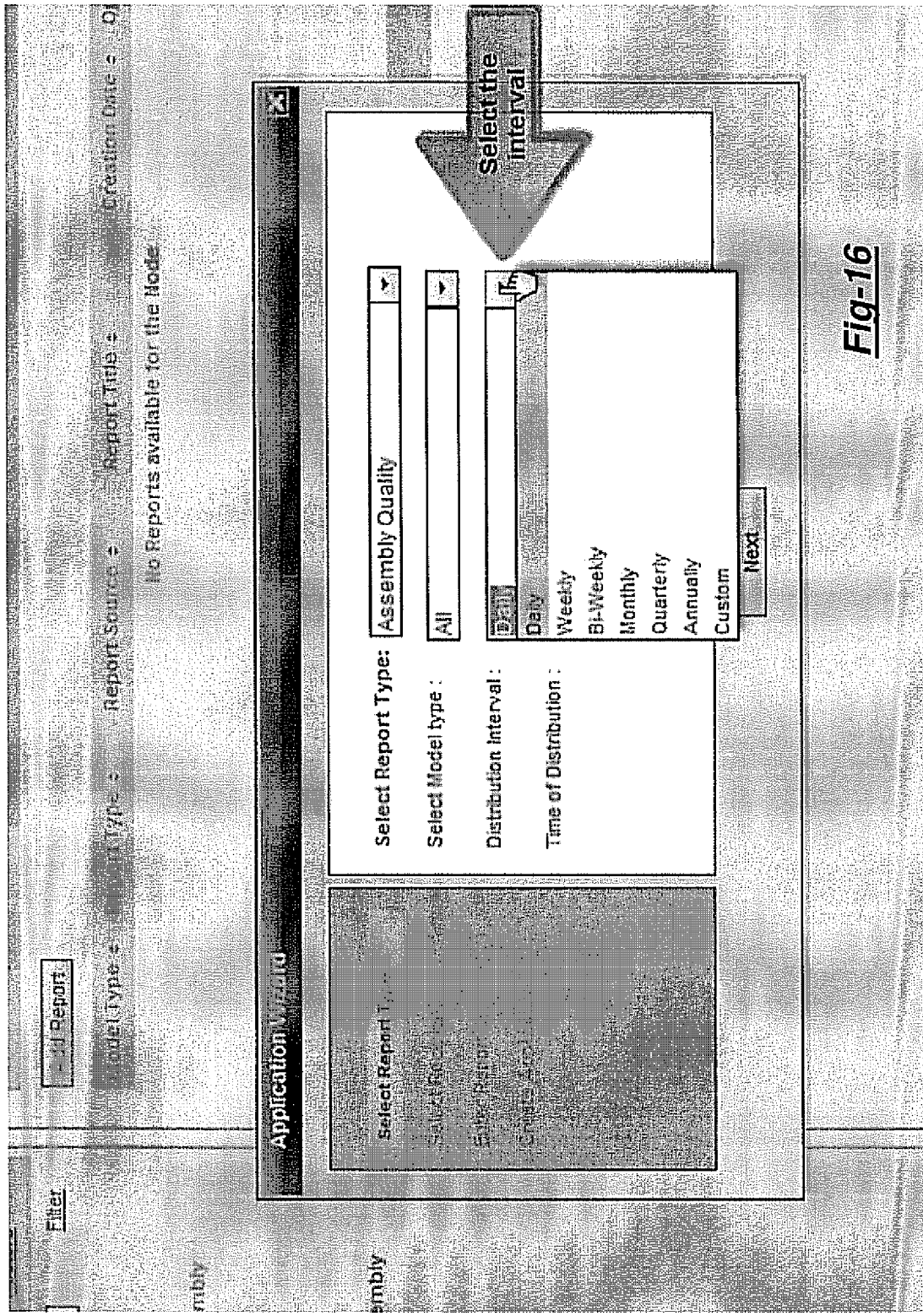
FIG. 16 is an illustrative screen shot showing selection of a time distribution interval for a report to be generated and/or delivered.
Figure 17:
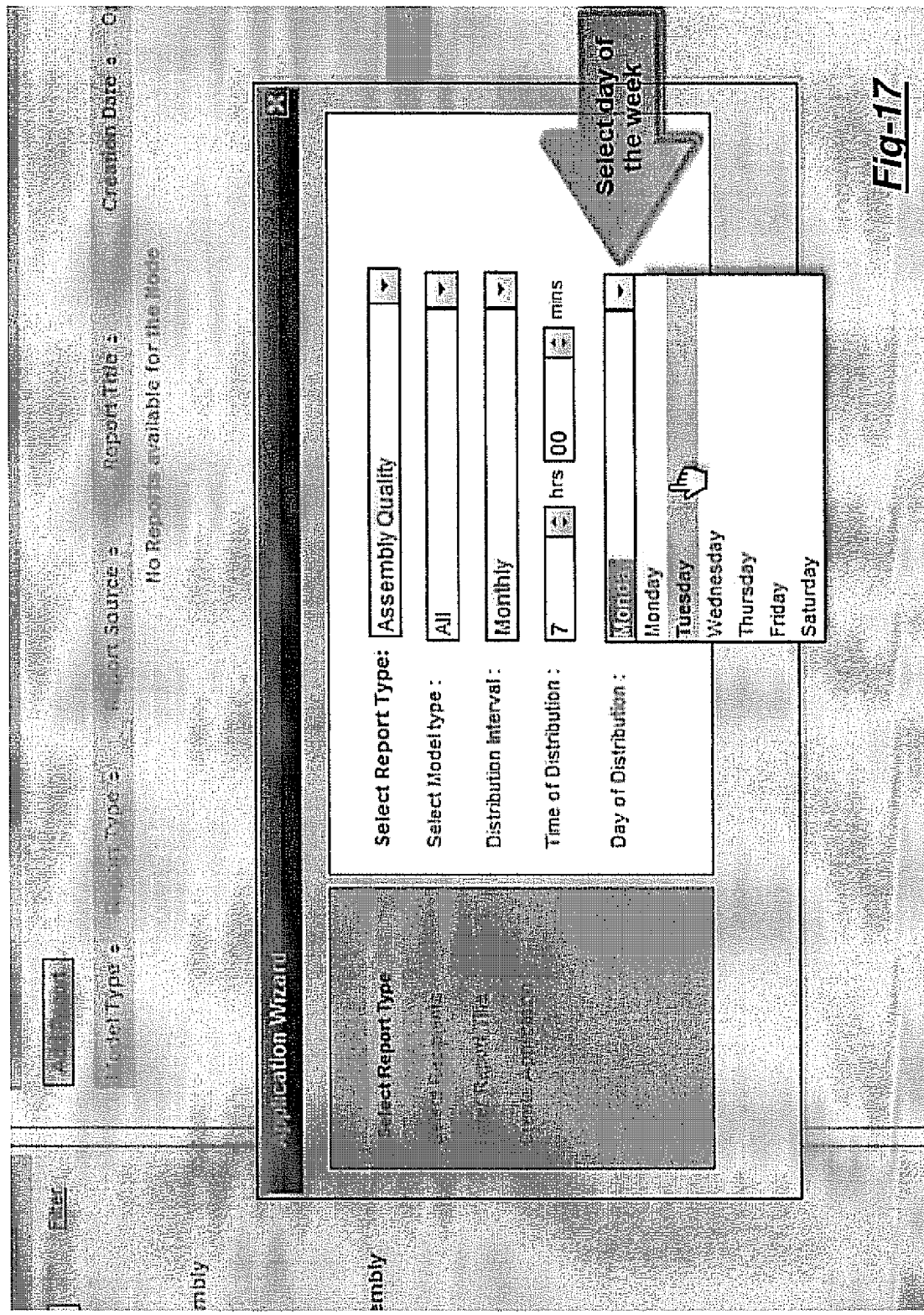
FIG. 17 is an illustrative screen shot illustrating a time-of-day and day-of-the-week for distribution for a report.
Figure 18:
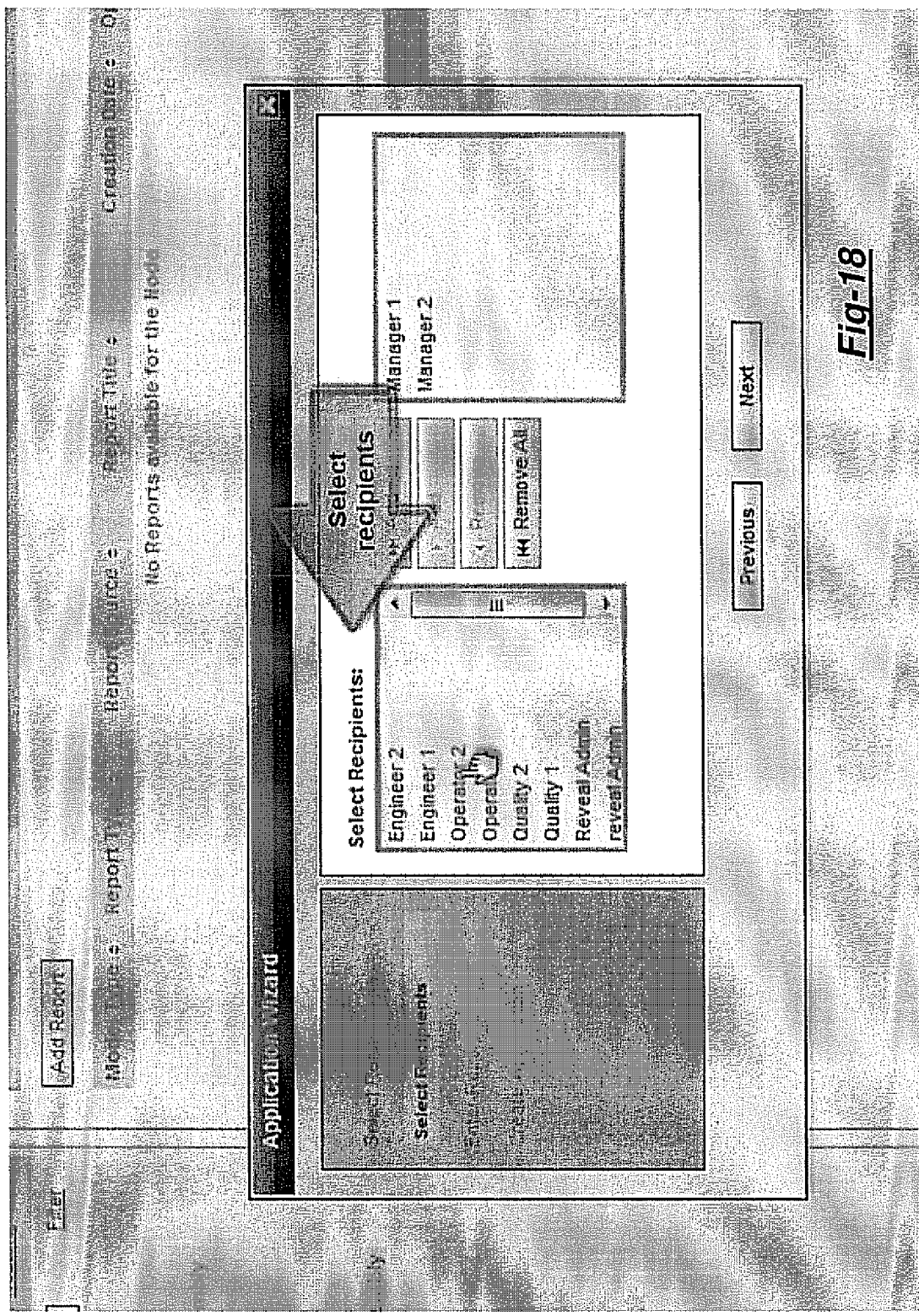
FIG. 18 is an illustrative screen shot showing selection of recipients to receive the report selected in FIG. 17.
Figure 19:
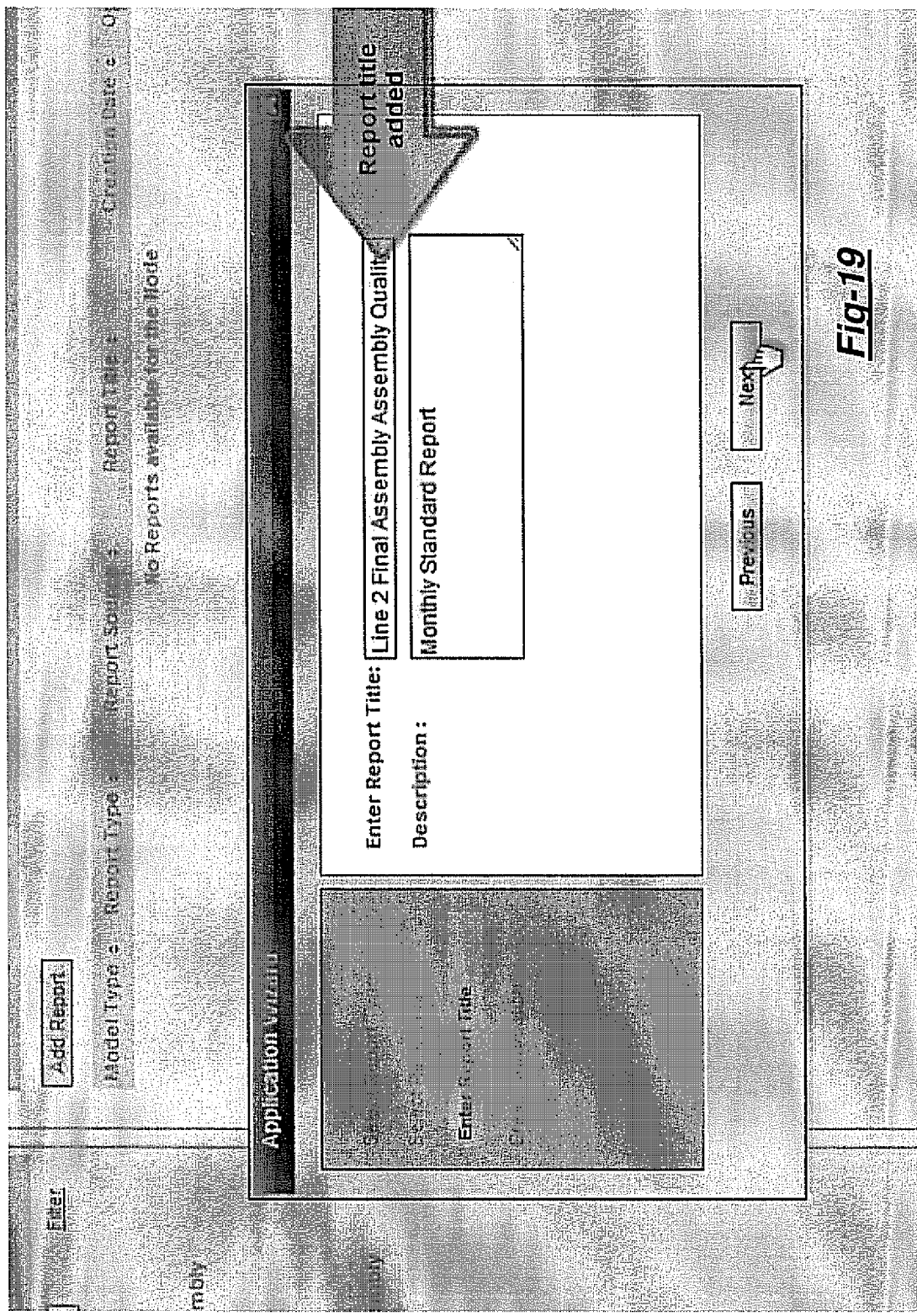
FIG. 19 is an illustrative screen shot showing a report title being added or assigned to the report selected in FIG. 17.

Referring back to the reporting capabilities of the system, FIG. 15 provides an illustrative screen shot in which a list of reports to be selected from can be provided to a user, while FIG. 16 illustrates that an "Assembly Quality" has been chosen. FIG. 17 illustrates that the Assembly Quality report is to be created on a monthly basis and delivered at 7:00 on Tuesday. FIG. 18 once again shows how recipients can be selected to receive the report and FIG. 19 illustrates that a title and description can be created for the report.

Figure 20:
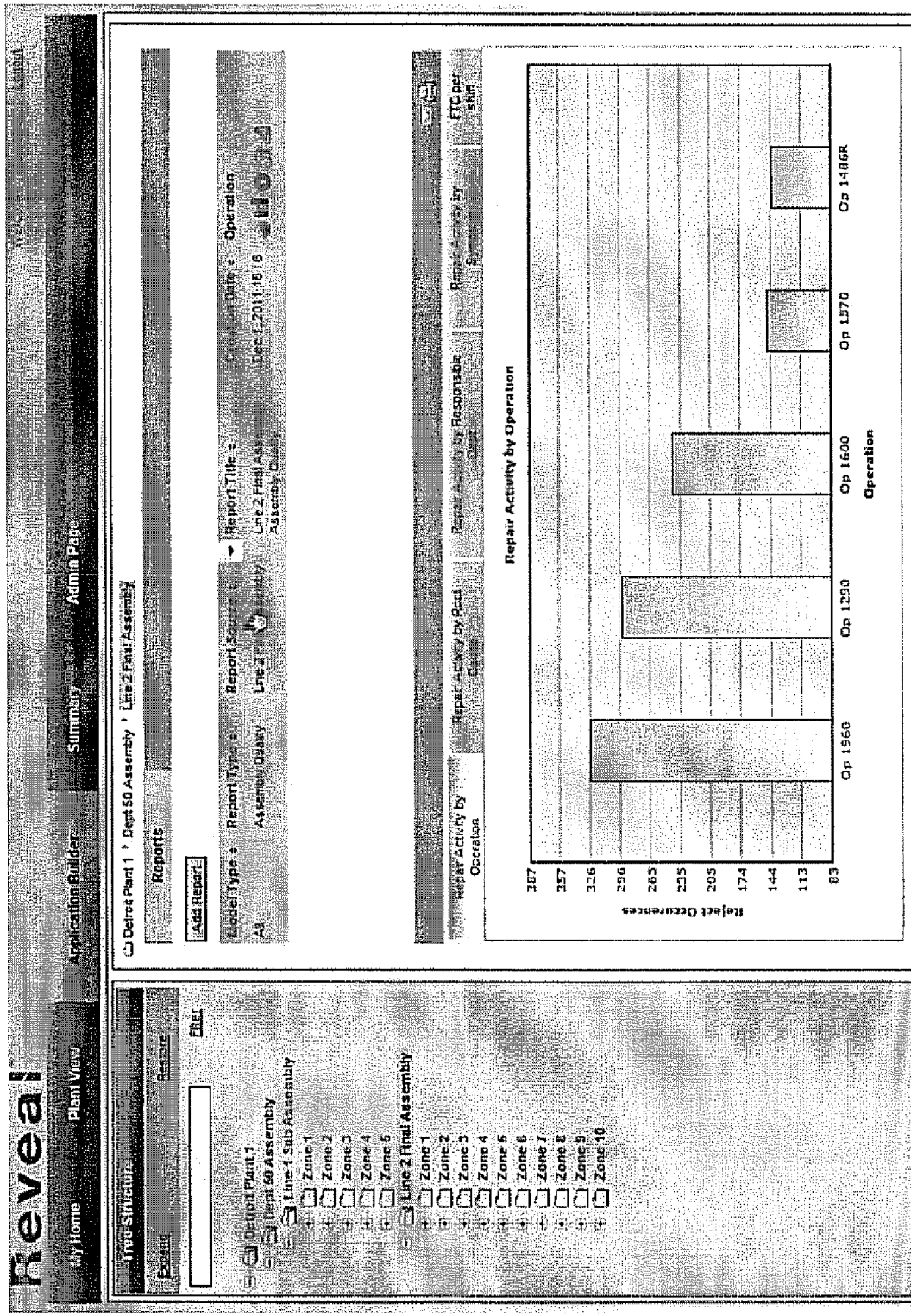
FIG. 20 is an illustrative screen shot for a report that has been generated and/or delivered.
Figure 21:
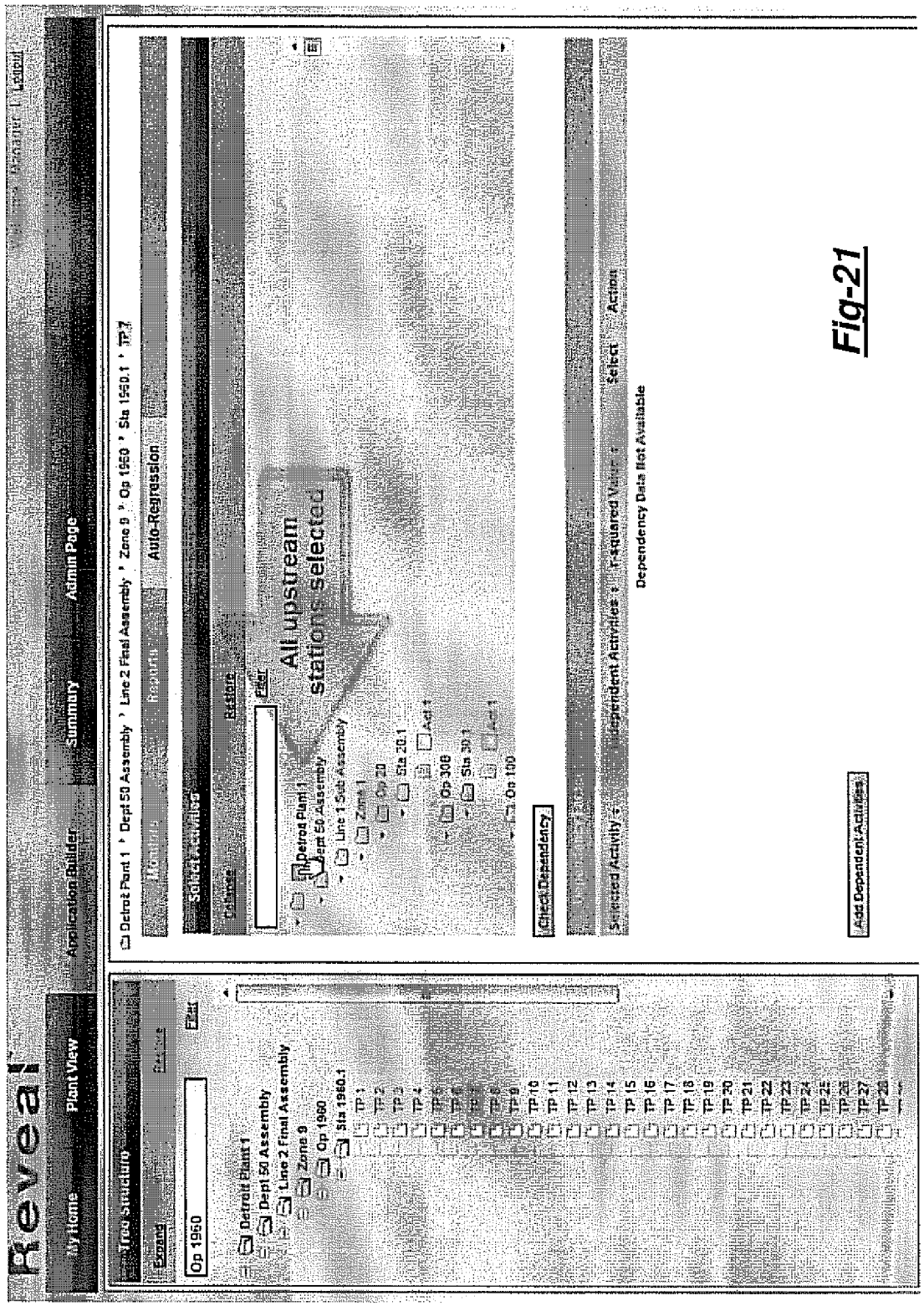
FIG. 21 is an illustrative screen shot showing a manufacturing facility tree structure and selection of an attribute (e.g. TP 7) with a high failure rate to be analyzed via auto-regression analysis.
Figure 22:
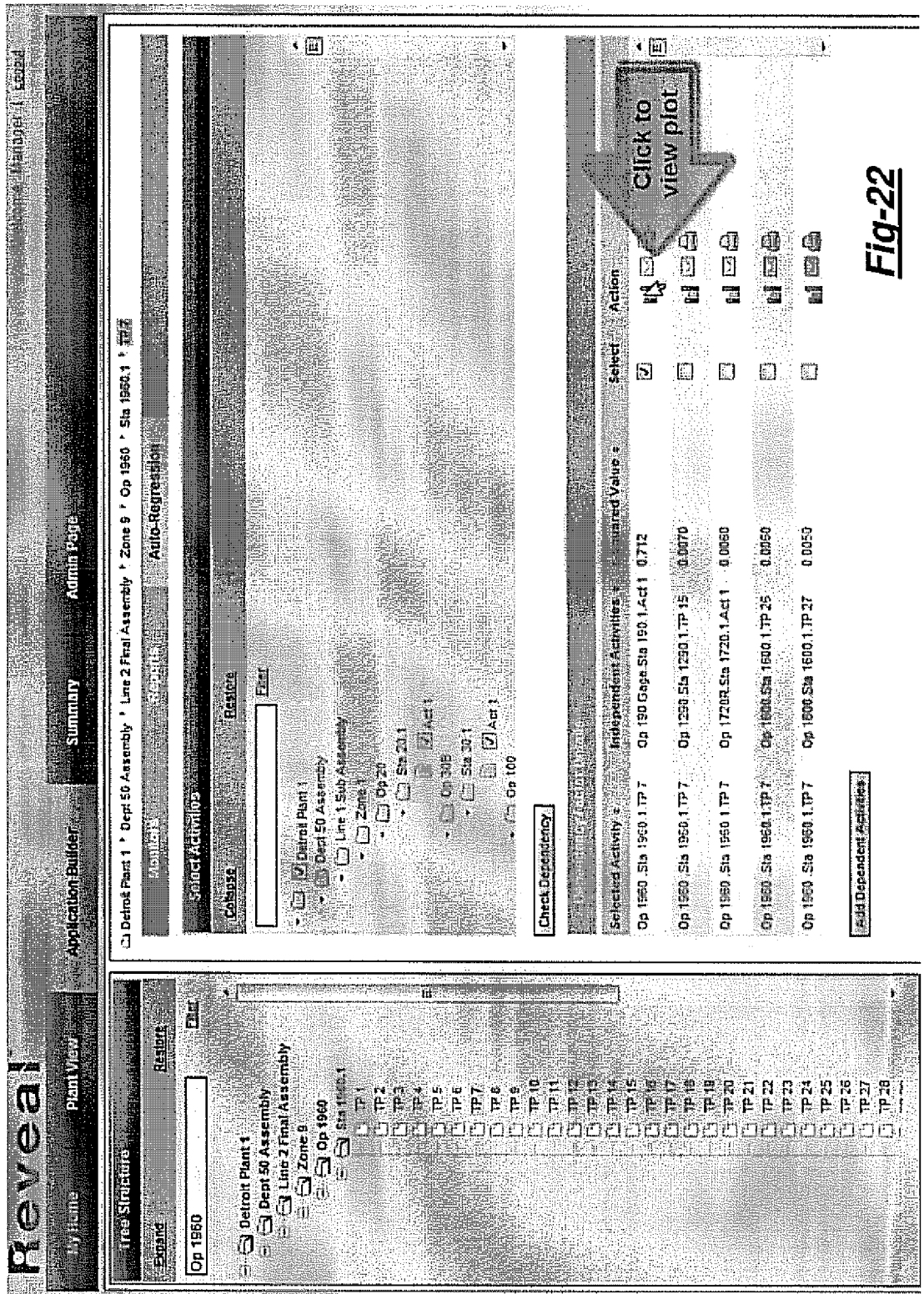
FIG. 22 is an illustrative screen shot showing operations and/or stations selected by the auto-regression analysis.
Figure 23:
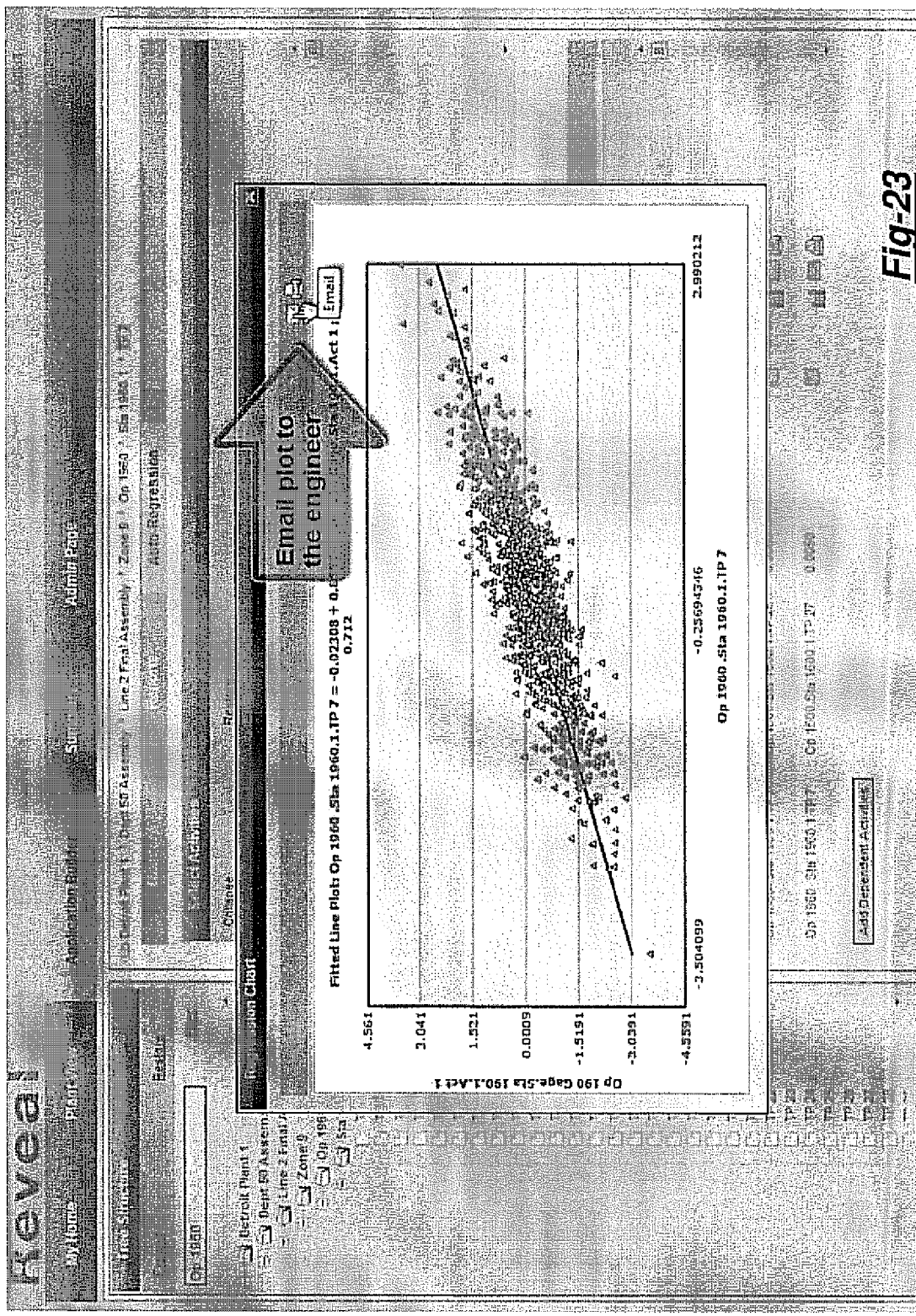
FIG. 23 is an illustrative screen shot showing a regression plot between the attribute with a high failure rate selected in FIG. 22 and an upstream operation identified by the auto-regression analysis.

FIG. 20 shows a result of such a report in which reject occurrences versus operation are shown in a bar-graph manner for Line 2 Final Assembly at Detroit Plant 1. Given the high number of occurrences at OP 1960, FIG. 21 illustrates results for an auto-regression analysis for station 1960.1, test point 7 with all upstream stations selected for the analysis. Upon execution of an auto-regression analysis, results can be provided as shown in FIG. 22 in which operation 190, gauge station 190.1, act 1 has an R-squared value of 0.712 and thus shows a strong correlation with operation 1960, station 1960.1, test point 7. Clicking on a bar graph tab as shown in FIG. 22 can afford for a regression analysis plot as shown in FIG. 23 which clearly illustrates a strong correlation between OP 190, gauge station 190.1, act 1 and OP 1960, station 1960.1, test point 7. It should be appreciated that OP 190, gauge station 190.1, act 1 was not present on the graph shown in FIG. 20 and as such was not one of the highest ranking problematic operations or stations. Therefore, it is appreciated that OP 190, gauge station 190.1, act 1 would be easily overlooked as a root cause for an out-of-tolerance measurements or out-of-control state found at OP 1960, station 1960.1, test point 7. As such, the auto-regression analysis can uncover a root cause not readily observable by simply analyzing data for each individual station.

Figure 24:
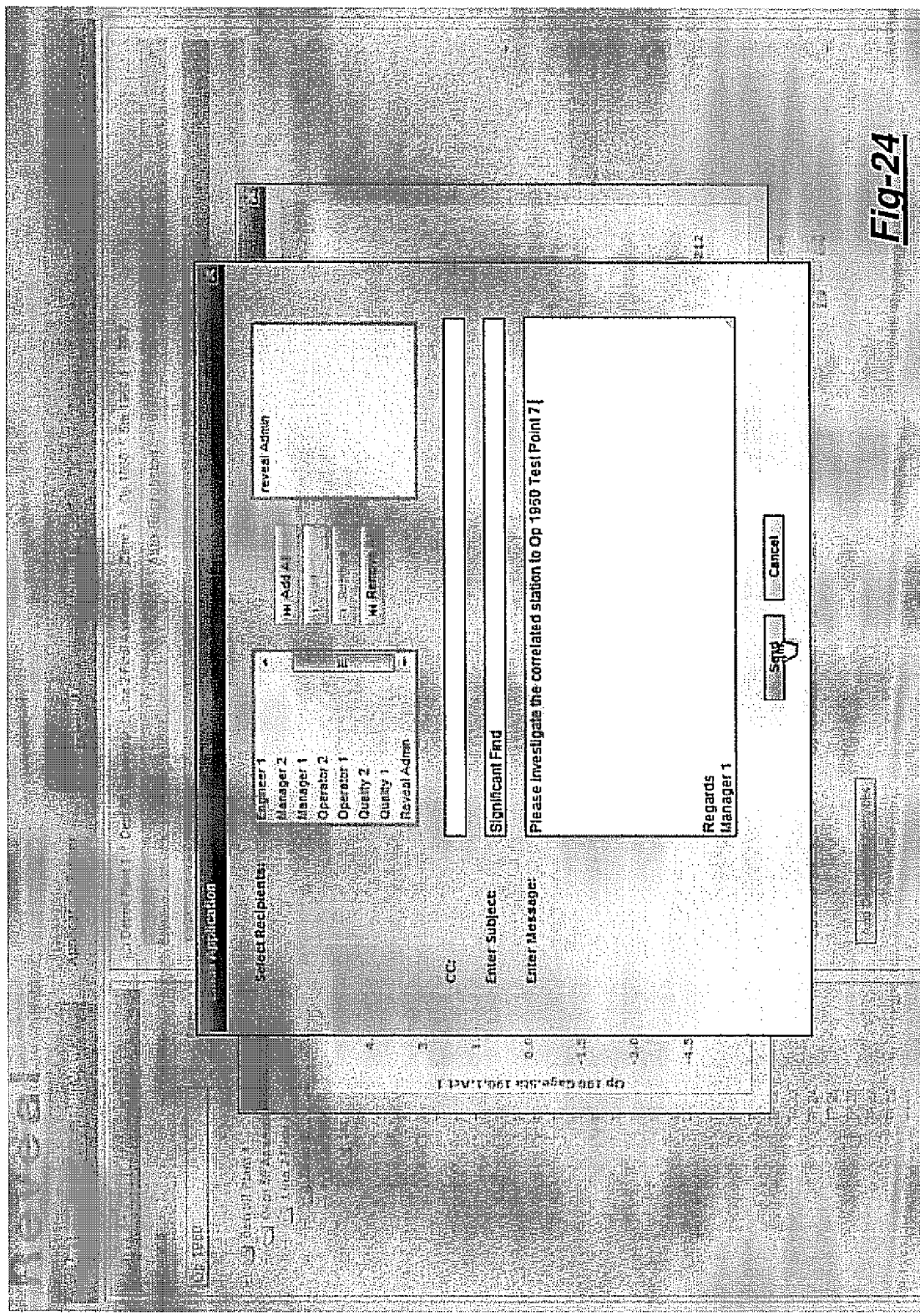
FIG. 24 is an illustrative screen shot for a notification containing the results of FIG. 23 in the form of an email and to be sent to appropriate recipients.
Figure 25:
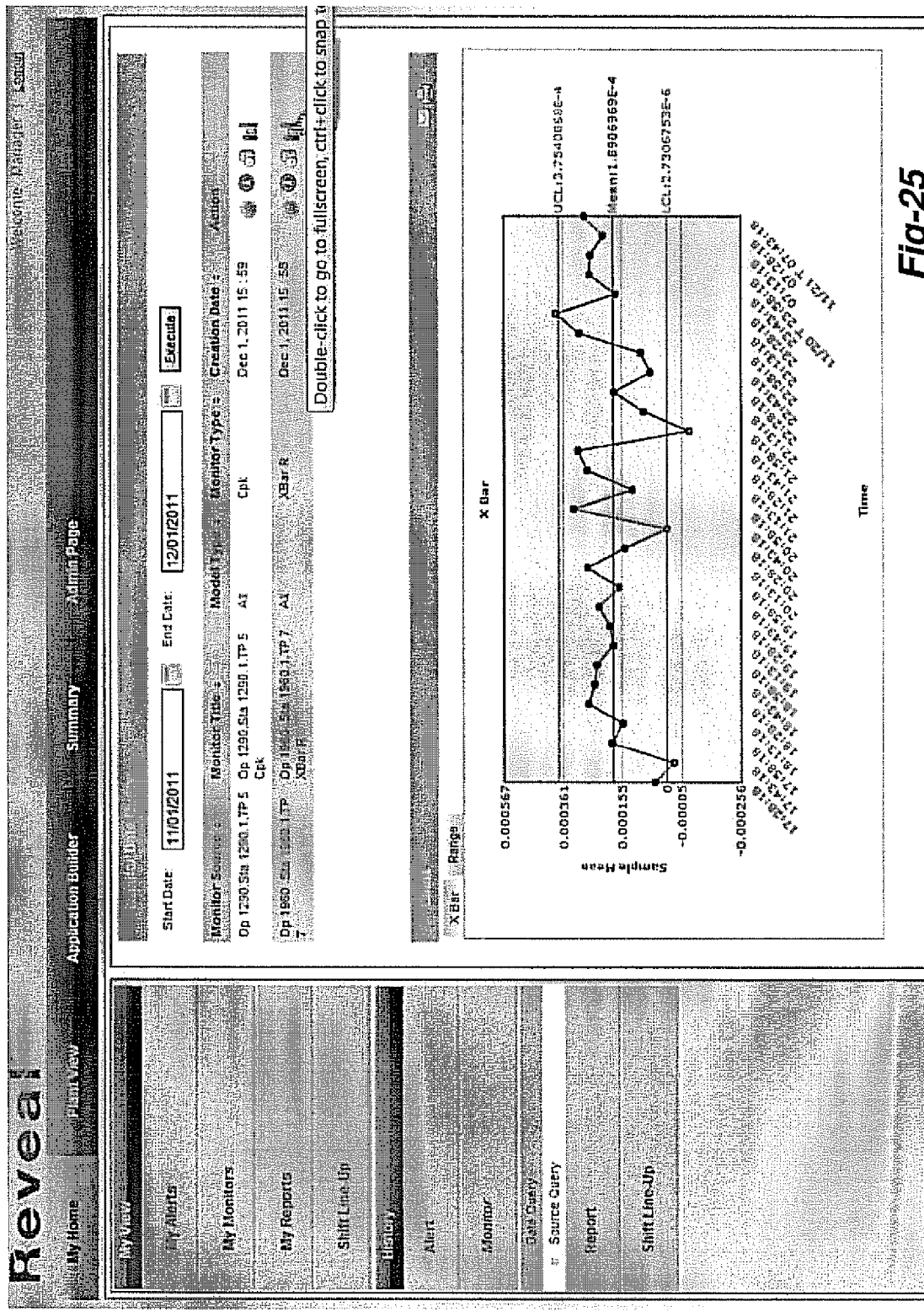
FIG. 25 is an illustrative screen shot of a results from a monitor assigned to the upstream operation identified in FIGS. 22 and 23.
Figure 26:
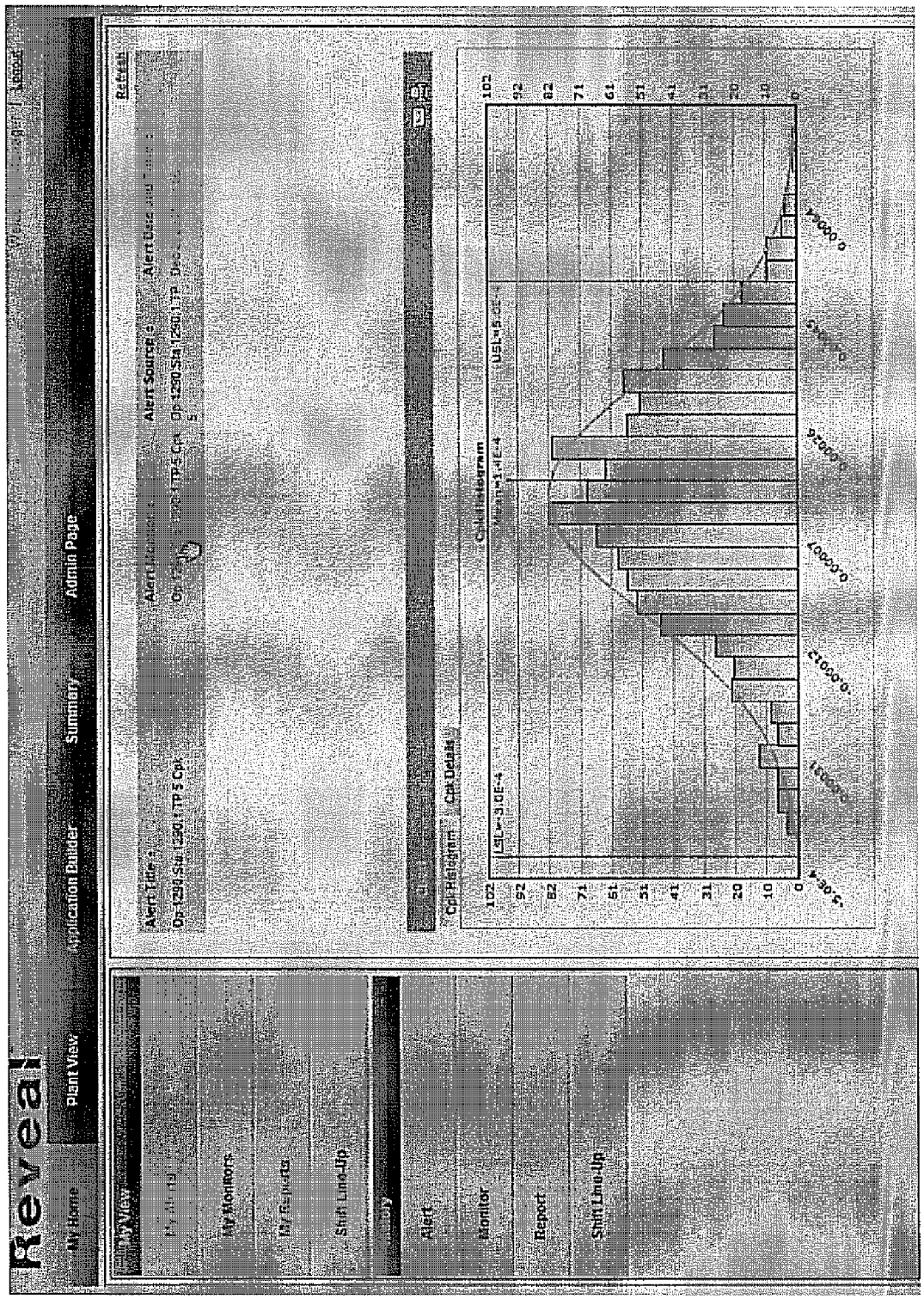
FIG. 26 is an illustrative screen shot for a statistical analysis on a particular upstream operation and/or station.
Figure 27:
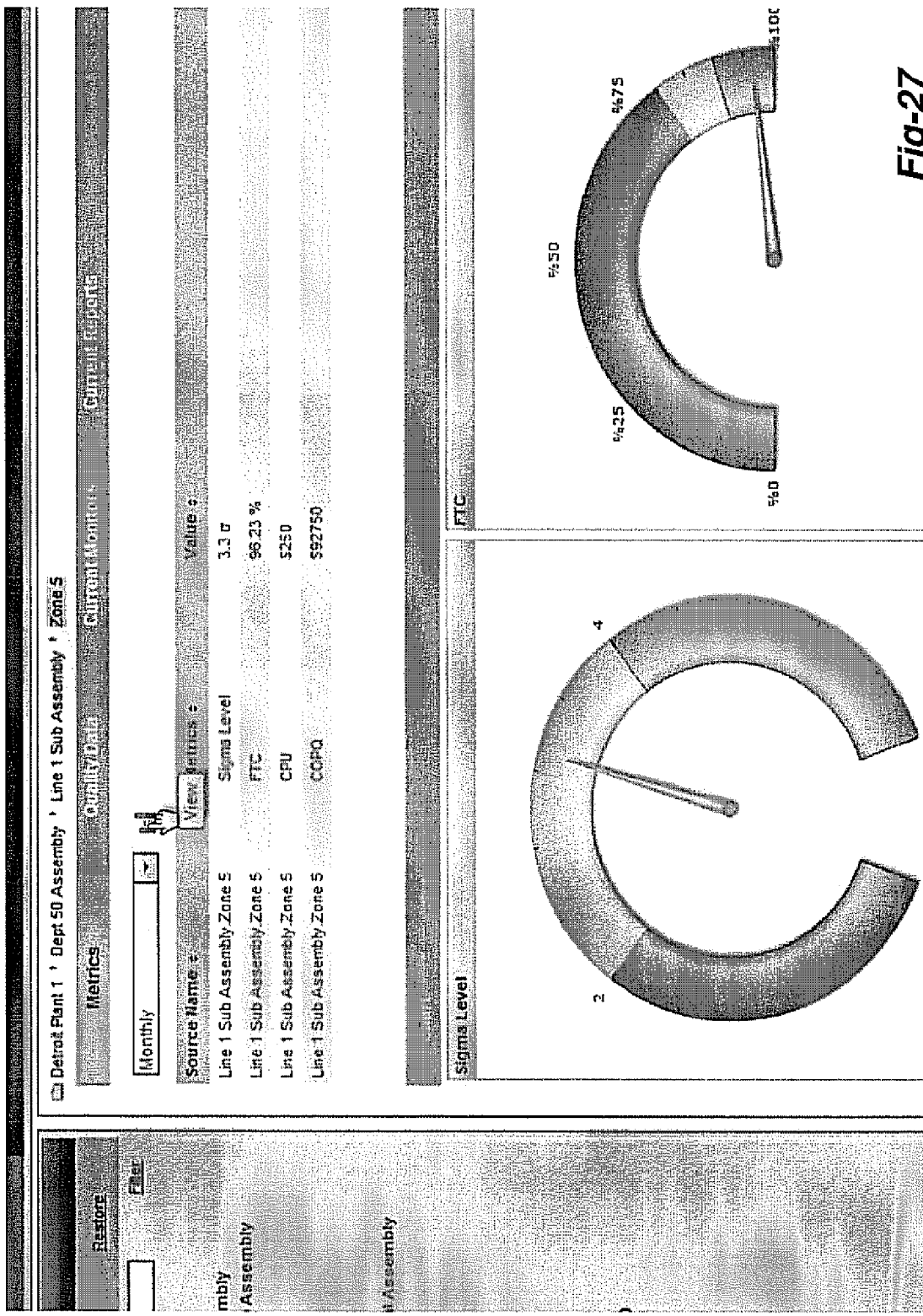
FIG. 27 is an illustrative screen shot showing overall metrics for a particular region of a manufacturing facility.

Turning now to FIG. 24, the results shown in FIG. 23 can be sent to selected recipients for further investigation of the station, operation, and the like. In addition, the Op 190, gauge station 190.1, act 1 can be assigned a monitor and the results of the monitor (FIG. 25) sent to selected recipients as discussed above. Furthermore, statistical tracking of such a problematic area can be calculated as shown in FIG. 26 in which a Cpk histogram is shown for a desired station. Finally, overall metrics for a particular area or zone of a manufacturing facility can be provided as shown in FIG. 27 in which zone 5 of line 1 sub assembly, department 50 assembly of Detroit Plant 1 is shown. Zone 5 has a 3.3 sigma level and an FTC compliance level of 96.23%. A cost per unit (CPU) can be assigned to a part or component and a total cost value for zone 5 can be calculated as also shown in the figure.

It is appreciated that the analysis of the manufacturing data can include one more statistical treatments, process analyses and/or process capabilities of the data known to those skilled in the art. For example and for illustrative purposes only, general linear model methods, generalized linear model methods, structural equation model methods, item response theory methods and the like can be used.

In addition to the above, the inventive system and process can include including providing an off-site system for receiving and using manufacturing data to discover out-of-tolerance measurements, perform an auto-regression analysis and find a correlation between at least one of the upstream operations and the out-of-tolerance measurement as described above. In some instances, the off-site system is a cloud-based system. It is appreciated that the term "cloud-based system" refers to a system that provides cloud computing with the delivery of computing, analysis, etc., as a service rather than a product and shared resources, software, and information are provided to computers and other devices as a metered service over a network.

It is also appreciated that the manufacturing data can be provided in real-time, i.e. from a manufacturing facility that is in operation with results from the inventive process and system used to make corrections, improvement, etc., to the in-operation facility. In the alternative, the manufacturing data can be provided in a "batch form" and the inventive process and system can be used for analysis of operations, faults, etc., with corrections, improvements, etc., made to the manufacturing facility some time in the future. As such, the process and system can be used to facilitate improved quality control for in-operation manufacturing facilities, facilities that are currently shut-down with plans for a start-up in the future and/or for the planning, designing, etc., of a new manufacturing facility that will be based in some part on a current or past facility from which the manufacturing data has been provided.

The invention is not restricted to the illustrative examples described above. The examples are not intended as limitations on the scope of the invention. Methods, systems apparatus and the like described herein are exemplary and not intended as limitations on the scope of the invention. Changes herein and other uses will occur to those skilled in the art and the scope of the invention is defined by the scope of the claims.

I claim:

1. A process for determining a root cause problem for an out-of-tolerance component manufactured by a plurality of operations performed on the component, the process comprising:

providing a manufacturing stream with a plurality of operation stations and a plurality of manufacturing machines with a manufacturing machine at each operation station;

passing one or more components through each of the plurality of operation stations such that a manufacturing operation is completed on each of the one or more components and a plurality of manufactured components is produced;

providing a virtual database connected to a first subset of the manufacturing machines and not connected to a second subset of the manufacturing machines;

providing a gauge station downstream from the plurality of operation stations, the gauge station taking measurements on manufactured components that have passed through the first subset of manufacturing machines and on other manufactured components that have passed through the second subset of manufacturing machines;

providing the virtual database with manufacturing data on the manufactured components from each of the first subset of manufacturing machines and measurement data from the gauge station on the other manufactured components that have passed through the second subset of manufacturing machines;

providing a data synthesis manager, the data synthesis manager discovering an out-of-tolerance measurement from at least one of the virtual database manufacturing data on at least a subset of the manufactured components that have passed through the first subset of manufacturing machines or the virtual database measurement data on at least another subset of the manufactured components that have sassed through the second subset of manufacturing machines;

the data synthesis manager also performing an auto-regression analysis between the out-of-tolerance measurement and the plurality of manufacturing machines using at least one of the virtual database manufacturing data or the virtual database measurement data; and the data synthesis manager also finding a correlation between at least one of the plurality of manufacturing machines and the out-of-tolerance measurement, the correlation identifying at least one manufacturing operation that is the root cause of the out-of-tolerance measurement.

2. The process of claim 1, further including sending at least one of a report and an alert related to the root cause to predefined personnel.

3. The process of claim 1, further including instantly initiating a continuous monitoring of the at least one upstream operation that is the root cause of the out-of-tolerance measurement using manufacturing data produced by the at least one upstream operation.

4. The process of claim 3, further including immediately notifying predefined personnel when the monitored upstream operation executes an out-of-tolerance operation.

5. The process of claim 4, wherein the notification is an electronic notification containing a graphical illustration of manufacturing data for the out-of-tolerance operation.

6. The process of claim 1, further including performing a statistical analysis on each of the manufacturing operations using at least one of the manufacturing data or the measurement data for the purpose of determining an out-of-tolerance performance level for each operation.

7. The process of claim 6, wherein the statistical analysis provides a ranking of the manufacturing operations with respect to which one or more manufacturing operations are producing out-of-tolerance measurements on the plurality of manufactured components.

8. The process of claim 7, wherein the ranking identifies a top subset of worst-performing operations.

9. The process of claim 8, wherein the auto-regression analysis is performed between at least one of the top subset of worst-performing operations and all upstream manufacturing operations for a given worst-performing operation in order to determine the manufacturing operation that is the root-cause for the given worst-performing operation.

10. The process of claim 9, wherein the manufacturing operation that is the root-cause is not one of the top subset of worst-performing operations identified by the ranking.

11. The process of claim 1, further including providing a cloud-based system for:

receiving and using the manufacturing data to discover the out-of-tolerance measurement on at least a subset of the plurality of manufactured components downstream from the plurality of manufacturing operations;

performing the auto-regression analysis between the out-of-tolerance measurement and the plurality of manufacturing operations using at least one of the manufacturing data or the measurement data; and finding the correlation between at least one of the manufacturing operations and the out-of-tolerance measurement, the correlation identifying the at least one manufacturing operation that is the root cause of the out-of-tolerance measurement.

12. The process of claim 11, wherein the manufacturing data is provided in real-time from a manufacturing facility.

13. The process of claim 11, wherein the manufacturing data is provided in batch form from a manufacturing facility for root-cause analysis.

* * * * *